(12) United States Patent
Lehtovirta et al.

(10) Patent No.: US 11,218,372 B2
(45) Date of Patent: Jan. 4, 2022

(54) METHODS, APPARATUSES, AND COMPUTER PROGRAM PRODUCTS FOR FACILITATING SYNCHRONIZATION OF SETTING CONFIGURATIONS

(71) Applicant: Nokia Technologies Oy, Espoo (FI)

(72) Inventors: Daniel Lehtovirta, Espoo (FI); Jan Pelttari, Bangalore (IN); Ali Henrikki Pitkanen, Helsinki (FI); Udo Szabo, Helsinki (FI); Aapo Bovellan, Espoo (FI); Santeri Leijola, Espoo (FI); Devi Sudha, Bangalore (IN); Uday M. Shankar, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/566,546

(22) Filed: Sep. 10, 2019

(65) Prior Publication Data

US 2020/0076692 A1 Mar. 5, 2020

Related U.S. Application Data

(63) Continuation of application No. 15/943,381, filed on Apr. 2, 2018, now Pat. No. 10,411,962, which is a
(Continued)

(30) Foreign Application Priority Data

Mar. 9, 2009 (IN) .............................. 471/DEL/2009

(51) Int. Cl.
*H04L 12/24* (2006.01)
*H04L 29/08* (2006.01)
(Continued)

(52) U.S. Cl.
CPC .......... *H04L 41/0846* (2013.01); *G06F 16/10* (2019.01); *H04L 12/00* (2013.01);
(Continued)

(58) Field of Classification Search
CPC .......................... H04L 12/00; G06F 17/30067
See application file for complete search history.

(56) References Cited

U.S. PATENT DOCUMENTS 7,269,433 B2  9/2007 Vargas et al.
7,788,352 B2  8/2010 Breuer et al.
(Continued)

FOREIGN PATENT DOCUMENTS

WO  2003044698 A1  5/2003

*Primary Examiner* — Arvin Eskandarnia
(74) *Attorney, Agent, or Firm* — Ditthavong, Steiner & Mlotkowski

(57) ABSTRACT

A method, apparatus, and computer program product are provided for facilitating synchronization of setting configurations. An apparatus may include a processor and a memory storing instructions that when executed by the processor cause the apparatus to configure a setting on the apparatus. The instructions when executed by the processor may further cause the apparatus to generate a settings data package comprising the setting configuration. The instructions when executed by the processor may additionally cause the apparatus to send the settings data package to a settings management service for synchronization of the setting configuration to at least one of a service or a user device. The settings management service may be configured to synchronize the setting configuration by distributing the settings data package to the at least one of the service or the user device. Corresponding methods and computer program products are also provided.

20 Claims, 18 Drawing Sheets

Related U.S. Application Data continuation of application No. 15/477,874, filed on Apr. 3, 2017, now Pat. No. 9,935,835, which is a continuation of application No. 12/463,675, filed on May 11, 2009, now Pat. No. 9,614,685.

(51) Int. Cl.
  *G06F 16/10* (2019.01)
  *H04L 12/00* (2006.01)
  *H04L 29/06* (2006.01)
  *H04W 8/18* (2009.01)
  *H04W 4/50* (2018.01)

(52) U.S. Cl.
  CPC .......... *H04L 63/08* (2013.01); *H04L 67/1095* (2013.01); *H04L 67/30* (2013.01); *H04L 63/20* (2013.01); *H04W 4/50* (2018.02); *H04W 8/18* (2013.01)

(56) References Cited

U.S. PATENT DOCUMENTS

| | | | |
|---|---|---|---|
| 7,827,199 B2 | 11/2010 | Yip et al. | |
| 7,865,707 B2 | 1/2011 | Bittlingmayer et al. | |
| 8,134,954 B2 | 3/2012 | Godfrey et al. | |
| 8,538,404 B2 | 9/2013 | Antani et al. | |
| 9,432,455 B2 | 8/2016 | Jeide et al. | |
| 2003/0172138 A1* | 9/2003 | McCormack | H04L 67/303 709/220 |
| 2003/0212772 A1* | 11/2003 | Harris | H04L 61/2514 709/220 |
| 2004/0088372 A1 | 5/2004 | Sivaraman et al. | |
| 2004/0142711 A1 | 7/2004 | Mahonen et al. | |
| 2004/0158583 A1 | 8/2004 | Kaappa | |
| 2004/0193731 A1 | 9/2004 | Mitchell | |
| 2004/0203684 A1 | 10/2004 | Jokinen et al. | |
| 2004/0204085 A1* | 10/2004 | Vargas | H04M 1/72412 455/557 |
| 2005/0033693 A1 | 2/2005 | Toiminen | |
| 2005/0091346 A1* | 4/2005 | Krishnaswami | H04L 63/101 709/220 |
| 2005/0154598 A1* | 7/2005 | Kanayama | G06Q 30/04 705/400 |
| 2005/0193080 A1* | 9/2005 | Gold | H04L 41/082 709/208 |
| 2006/0052091 A1 | 3/2006 | Onyon et al. | |
| 2006/0073832 A1* | 4/2006 | Pfister | H04W 24/00 455/446 |
| 2006/0154649 A1 | 7/2006 | Pedersen et al. | |
| 2007/0014314 A1 | 1/2007 | O'Neil | |
| 2007/0016632 A1 | 1/2007 | Schulz et al. | |
| 2007/0016676 A1 | 1/2007 | Breuer et al. | |
| 2007/0058634 A1* | 3/2007 | Gupta | H04L 67/12 370/392 |
| 2007/0130541 A1 | 6/2007 | Louch et al. | |
| 2007/0250645 A1 | 10/2007 | Meadows et al. | |
| 2008/0026729 A1 | 1/2008 | May et al. | |
| 2008/0104207 A1 | 5/2008 | Pulkkinen et al. | |
| 2008/0114855 A1 | 5/2008 | Welingkar et al. | |
| 2008/0215758 A1 | 9/2008 | Gerdes et al. | |
| 2009/0040947 A1 | 2/2009 | Krivopaltsev | |
| 2009/0138579 A1 | 5/2009 | Jung | |
| 2009/0177800 A1 | 7/2009 | Gidron et al. | |
| 2010/0228836 A1* | 9/2010 | Lehtovirta | H04L 41/0846 709/220 |

\* cited by examiner

OVI.COM

OVI SETTINGS

| My Info | Printing |

My Account      Basic info

My Devices      User ID
                John Doe

Sync & Back-up  Personal info

Services        Name

Lifestreaming   Subscribed Services
                1. Music
                2. Maps
                3. Games
                4. Photos View New Services

FIG. 6c.

My Info
/ Personal ▲

Language
English

Name
John Doe

Subscribed Services
Nokia Music
Nokia Maps
Nokia Games
Nokia Photos

Options                    Back

FIG. 6d.

| My Information | Privacy |

Privacy Center

Managing your master privacy settings

Whole Profile

| Only Nokia Services ▲ |

Personal Info

| Private ▲ |

Browsing History

| Private ▲ |

Address Book

| Open to All ▲ |

Basic Info

| Open to All ▲ |
| Private ▲ |
| Only Nokia Services and Applications ▲ |

GPS Location

| Open to All ▲ |

Marketing Subscriptions

|  |  | Email | SMS | Call |
|---|---|---|---|---|
| ☐ | Nokia OVI Services Newsletter | ☐ | ☐ | ☐ |
| ☐ | Nokia Services | | | |
|  | » Music free tracks, new releases | ☐ | ☐ | ☐ |
|  | » Maps Newsletter | ☐ | ☐ | ☐ |
|  | » Share news promotion | ☐ | ☐ | ☐ |

FIG. 6e.

OVI.com

OVI Settings
≫ My Accounts
≫ My Devices
≫ Sync & Backup
≫ Services

≫ Lifestreaming

◀ [Share] [Music] [Maps] [Games] ▶

Share Settings

Upload Profile
   Upload secret word     Upload Profile
     Upload secret word     Alerts/Message form
     ○ Yes                    ☐ On
     ○ No                     ☐ Off Notify me when         Contents/Additions
     ☐ New Media...       [ Only Me ▲ ]
     ☐ New
     ☐ New Media by...    Show my relationships
     ☐ New comments...   [ My Contacts Only ▲ ]
     ☐ My guest join Forward these messages
     ☐ Mentioned...
     ☐ Personal...         Forward messages
     ☐ News...             ☐ Email
                                ☐ Phone

[ CANCEL ]     [ UPDATE ]

FIG. 8.

OVI.com

OVI Settings
≫ My Accounts
≫ My Devices
≫ Sync & Backup
≫ Services
≫ Lifestreaming Sync Settings
Select devices to be Synchronized: | All ▲ |
| N95 ▲ | Manage |
| N81 ▲ |

Sync Content
☐ Contacts
☐ Calendar
☐ Messages
☐ Bookmarks
☐ Images, videos
☐ OVI Settings
   ☐ Account
   ☐ Devices
   ☐ Services
   ☐ Lifestreaming Automatic Sync
☐ Do Not Sync Automatic
☐ Sync Every Time I Connect
☐ Sync Periodically
Period | 15 min ▲ |

Create Log File
☐ Most recent events (10)
☐ Most recent events (20)
☐ Most recent events (30)

Direction
☐ Update in both directions
☐ Only update user device to settings management service
☐ Only update settings management service to user device Medium to add device configuration
☐ Wired connection
☐ Via web provisioning (SMS)

Conflict Resolution

| Cancel | Update |

FIG. 9.

METHODS, APPARATUSES, AND COMPUTER PROGRAM PRODUCTS FOR FACILITATING SYNCHRONIZATION OF SETTING CONFIGURATIONS

CROSS-REFERENCE TO RELATED APPLICATIONS

This application is a continuation of U.S. patent application Ser. No. 15/943,381 (Now U.S. Pat. No. 10,411,962) filed on Apr. 2, 2018, which is a continuation of U.S. patent application Ser. No. 15/477,874 (Now U.S. Pat. No. 9,935,835) filed on Apr. 3, 2017, which is a Continuation of U.S. patent application Ser. No. 12/463,675 (Now U.S. Pat. No. 9,614,685) filed on May 11, 2009, which claims priority to an Indian Patent Application No. 471/DEL/2009 filed on Mar. 9, 2009, which is incorporated herein by reference in its entirety.

TECHNOLOGICAL FIELD

Embodiments of the present invention relate generally to communication technology and, more particularly, relate to methods, apparatuses, and computer program products for facilitating synchronization of setting configurations.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies as well as evolved computing devices making use of networking technologies continue to facilitate ease of information transfer and convenience to users. One area in which there is a demand to further improve ease of information transfer is facilitating synchronization of setting configurations across multiple services accessed by a consumer with a computing device and/or across multiple computing devices used by the consumer.

In this regard, consumers often use their computing device(s) to access a multitude of services, such as over a network. Each of these services may require or may at least provide the ability for a consumer to configure one or more settings for the service, which may control, for example, how the service is provided to the consumer's computing device. Some of these configuration settings, such as email notification settings, may not be unique to a single service, and as such may be applicable across multiple services. Hence, it would be helpful to the consumer if there was a way to synchronize common setting configurations between services so that the consumer would only have to configure a common setting configuration setting once, regardless of how many services the consumer uses.

Some consumers may use multiple computing devices to access a service. In this regard, a consumer may, for example, access a service with a first computer from his office, a second computer from his home, and a mobile terminal when in transit. Although each device may have unique characteristics and capabilities, there may be unique service usage settings or preferences defining how the service is to be provided to the consumer that the consumer would like to be applied to each of the devices used to access the service. Hence, it would be helpful to the consumer if there was a way to synchronize common setting configurations between devices so that the consumer would only have to configure a common setting configuration setting once, even if the consumer uses multiple devices to access the service. Unfortunately, with existing technologies, the consumer may be required to configure the appropriate settings on each device that he uses to access the service.

Accordingly, it would be advantageous to provide methods, apparatuses, and computer program products for facilitating synchronization of setting configurations.

BRIEF SUMMARY OF SOME EXAMPLES OF THE INVENTION

A method, apparatus, and computer program product are therefore provided for facilitating synchronization of setting configurations. In this regard, a method, apparatus, and computer program product are provided that may provide several advantages to computing devices, computing device users, and service providers. As such, then, some embodiments of the invention provide several advantages to computing devices, computing device users, and service providers. The synchronization performed by embodiments of the invention streamlines usage of services and/or access to data by users having multiple user devices used to access services and/or data. Further, embodiments of the invention enable synchronization of setting configurations between multiple services so that a user only has to configure a setting for one service and the setting is then synchronized to other services. Embodiments of the invention further provide for backup of setting configurations, as setting configurations for a first user device can be synchronized to another user device of the user or back to the first user device, such as if the memory of the first user device is corrupted.

In a first exemplary embodiment, a method is provided, which may include configuring a setting on a first user device. The method may further include generating, with a settings management unit embodied on the first user device, a settings data package comprising the setting configuration. The method may additionally include sending the settings data package to a settings management service for synchronization of the setting configuration to at least one of a service or a second user device. The settings management service may be configured to synchronize the setting configuration by distributing the settings data package to the at least one of a service or a second user device.

In another exemplary embodiment, a method is provided, which may include receiving, at a settings management service, a settings data package generated by a first user device. The settings data package may comprise a setting configuration. The method may additionally include synchronizing the setting configuration to at least one of a service or a second user device by distributing the settings data package to the at least one of a service or a second user device.

In another exemplary embodiment, an apparatus is provided, which may include a processor and a memory storing instructions that when executed by the processor cause the apparatus to configure a setting on the apparatus. The instructions when executed by the processor may further cause the apparatus to generate a settings data package comprising the setting configuration. The instructions when executed by the processor may additionally cause the apparatus to send the settings data package to a settings management service for synchronization of the setting configuration to at least one of a service or a remote user device. The settings management service may be configured to synchronize the setting configuration by distributing the settings data package to the at least one of a service or a remote user device.

In another exemplary embodiment, an apparatus is provided, which may include a processor and a memory storing instructions that when executed by the processor cause the apparatus to receive a settings data package generated by a first user device. The settings data package may comprise a setting configuration. The instructions when executed by the processor may additionally cause the apparatus to synchronize the setting configuration to at least one of a service or a second user device by distributing the settings data package to the at least one of a service or a second user device.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction may be configured for configuring a setting on a first user device. The second program instruction may be configured for generating a settings data package comprising the setting configuration. The third program instruction may be configured for causing the settings data package to be sent to a settings management service for synchronization of the setting configuration to at least one of a service or a second user device. The settings management service may be configured to synchronize the setting configuration by distributing the settings data package to the at least one of a service or a second user device.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction may be configured for causing a settings data package generated by a first user device to be received. The settings data package may comprise a setting configuration. The second program instruction may be configured for synchronizing the setting configuration to at least one of a service or a second user device by causing the settings data package to be distributed to the at least one of a service or a second user device.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

FIGS. 6A through 6F illustrate a series of user interfaces that may be presented to a user when using a settings management service to configure a setting according to an exemplary embodiment of the invention;

FIG. 8 illustrates a user interface that may be presented to a user when using a settings management service to select a service and configure a setting for the service according to an exemplary embodiment of the invention;

FIG. 9 illustrates a user interface that may be presented to a user when using a settings management service to configure synchronization and/or backup settings according to an exemplary embodiment of the invention;

DETAILED DESCRIPTION

Figure 1:
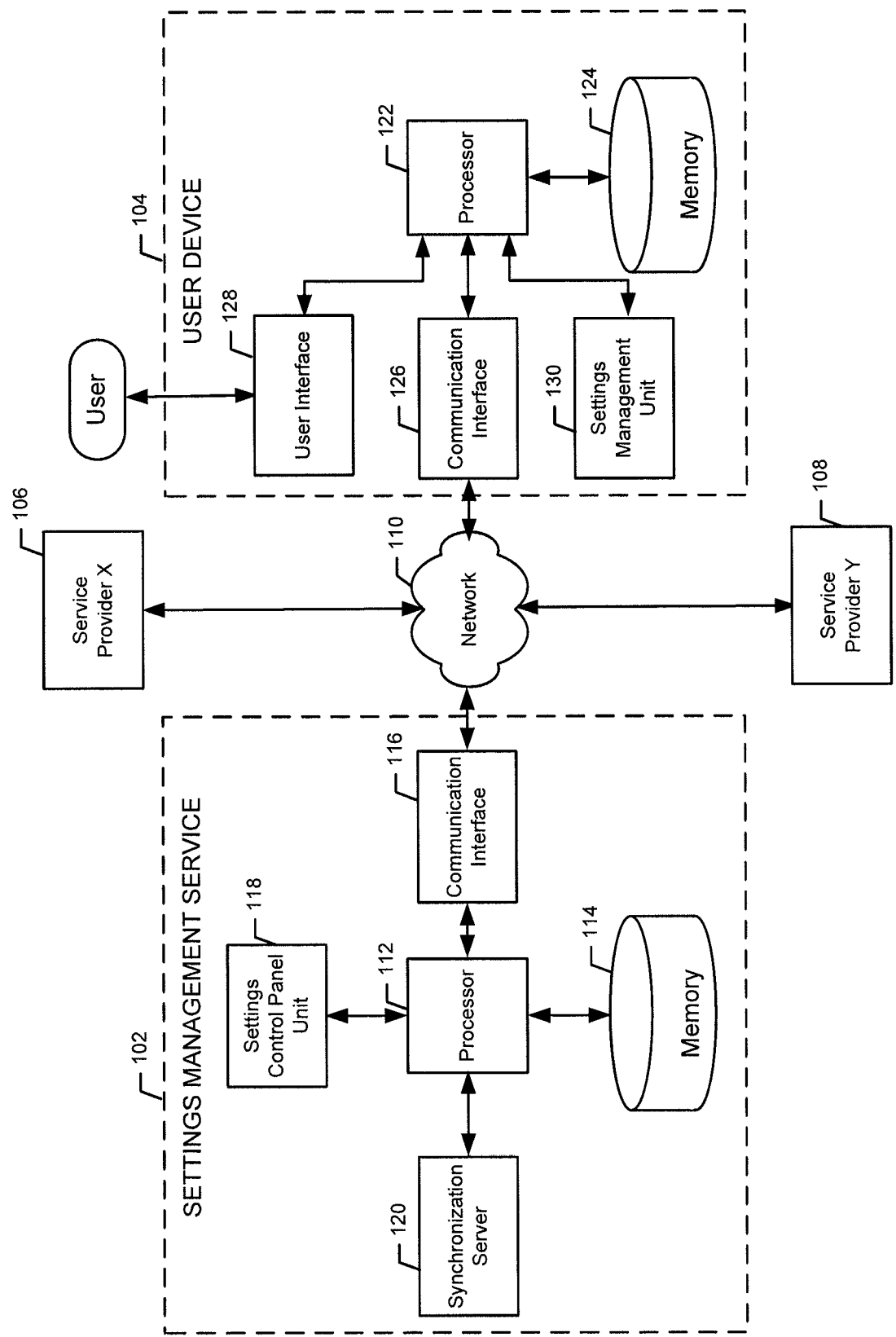
FIG. 1 illustrates a system for facilitating synchronization of setting configurations according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Embodiments of a System for Facilitating Synchronization of Setting Configurations FIG. 1 illustrates a block diagram of a system 100 for facilitating synchronization of setting configurations according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for facilitating synchronization of setting configurations, numerous other configurations may also be used to implement embodiments of the present invention.

"Settings" may comprise, for example, account settings, marketing settings (e.g., advertisement preferences), privacy settings, device settings, backup settings, restore settings, setting configuration synchronization settings, and/or the like. Settings may be generic and may be applied across multiple services and/or user devices. Example generic settings that may be applied across multiple services and/or devices may comprise marketing consent settings or account user identification settings. Settings may additionally or alternatively be specific, applying only to a specific service and/or user device. Accordingly, a "setting configuration" may comprise a configured setting (e.g., email address=John_Doe@isp.com, marketing preference=automobile advertisements, and/or the like).

A "service" may comprise, for example, provision of data or other content (e.g., web pages, multimedia streaming services, and/or the like), a financial service (e.g., online banking), e-mail, instant messaging, online gaming (e.g., multi-player gaming), peer-to-peer file transfer, web browsing, social networking, photograph hosting, video hosting, music hosting, settings management, and/or similar services that may be accessed by and/or supplied to remote computing devices over a network or communications link. An entity and/or computing device(s) providing a service may comprise a "service provider."

In at least some embodiments, the system 100 includes a settings management service 102, one or more user devices 104, and one or more service providers (e.g., service provider X 106 and service provider Y 108) configured to communicate over the network 110. The settings management service 102 may be embodied as any computing device or plurality of computing devices configured to provide settings management services as described herein to a user device 104 and/or a service provider over the network 110. The network 110 may be embodied as any wireless network (e.g., a cellular network), wireline network, or combination thereof. In at least some embodiments, the network 110 comprises or is otherwise embodied as the Internet. A user device 104 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like that is configured to communicate with other devices of the system 100 over the network 110 (e.g., to access services provided by a service provider). In an exemplary embodiment, a user device 104 is embodied as a mobile terminal, such as that illustrated in FIG. 2.

Figure 2:
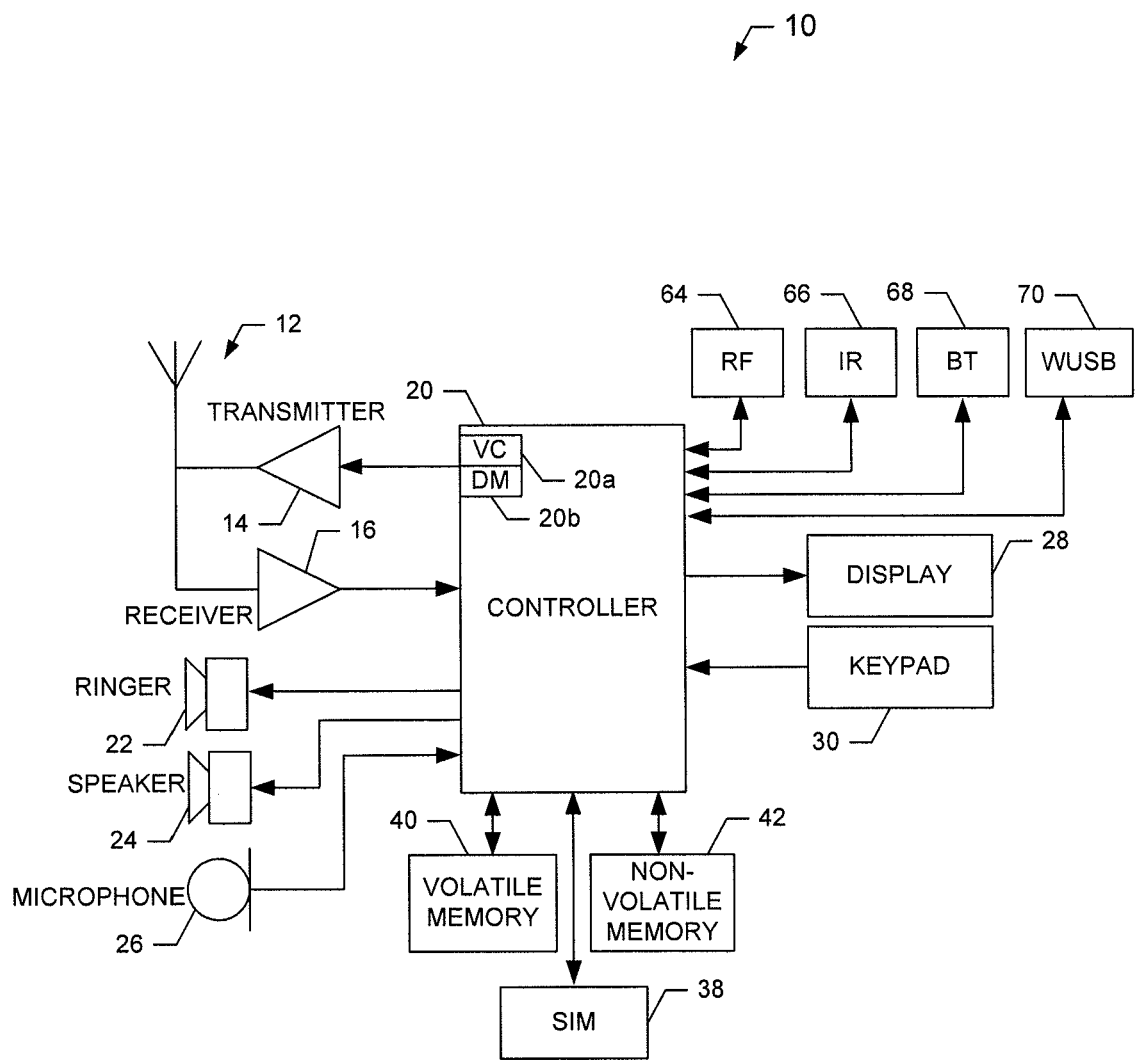
FIG. 2 is a schematic block diagram of a mobile terminal according to an exemplary embodiment of the present invention.

In this regard, FIG. 2 illustrates a block diagram of a mobile terminal 10 representative of one embodiment of a user device 102 in accordance with embodiments of the present invention. It should be understood, however, that the mobile terminal 10 illustrated and hereinafter described is merely illustrative of one type of user device 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TDSCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or WiMAX protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20*a*, an internal data modem (DM) 20*b*, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an exemplary embodiment, the settings management service 102 includes various means, such as a processor 112, memory 114, communication interface 116, and settings control panel unit 118, and synchronization server 120 for performing the various functions herein described. These means of the settings management service 102 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 114) that is executable by a suitably configured processing device (e.g., the processor 112), or some combination thereof. These means may be embodied on a single computing device or may be distributed or otherwise dispersed among a plurality of computing devices. For example, the synchronization server 120 may comprise a first computing device remote from a second computing device comprising other means of the settings management service (e.g., the settings control panel unit 118) and may communicate with the second computing device over the network 110.

The processor 112 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. In an exemplary embodiment, the processor 112 is configured to execute instructions stored in the memory 114 or otherwise accessible to the processor 110. Although illustrated in FIG. 1 as a single processor, in some embodiments the processor 112 comprises a plurality of processors. The plurality of processors may be embodied on a single computing device or may be distributed across a plurality of computing devices, which may be in operative communication with each other, such as over the network 110, to collectively perform one or more functionalities of the settings management service 102 as described herein.

The memory 114 may include, for example, volatile and/or non-volatile memory. Although illustrated in FIG. 1 as a single memory, the memory 114 may comprise a plurality of memories, which may include volatile memory, non-volatile memory, or some combination thereof. In this regard, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the settings management service 102 to carry out various functions in accordance with exemplary embodiments of the present invention. For example, in at least some embodiments, the memory 114 is configured to buffer input data for processing by the processor 112. Additionally or alternatively, in at least some embodiments, the memory 114 is configured to store program instructions for execution by the processor 112. The memory 114 may comprise one or more databases that store information in the form of static and/or dynamic information. The stored information may include setting configurations (e.g., for a user, a user device 104, a service, and/or the like), settings data packages, user interface widgets, and/or the like. This stored information may be stored and/or used by settings control panel unit 118 and/or synchronization server 120 during the course of performing their functionalities.

The communication interface 116 may be embodied as any device or means embodied in hardware, a computer program product comprising computer readable program instructions stored on a computer readable medium (e.g., the memory 114) and executed by a processing device (e.g., the processor 112), or a combination thereof that is configured to receive and/or transmit data from/to a remote device, such as the user device 104 and/or a service provider over the network 110. In at least one embodiment, the communication interface 116 is at least partially embodied as or otherwise controlled by the processor 112. The communication interface 116 may include, for example, an antenna, a transmitter, a receiver, a transceiver and/or supporting hardware or software for enabling communications with other entities of the system 100. The communication interface 116 may be configured to receive and/or transmit data using any protocol that may be used for communications between computing devices of the system 100. In this regard, the communication interface 116 may be configured to receive and/or transmit setting configurations and/or settings data packages from and/or to other devices of the system 100. The communication interface 116 may additionally be in communication with the memory 114, settings control panel unit 118, and/or synchronization server 120, such as via a bus.

The settings control panel unit 118 may be embodied as various means, such as hardware, a computer program product comprising computer readable program instructions stored on a computer readable medium (e.g., the memory 114) and executed by a processing device (e.g., the processor 112), or some combination thereof and, in one embodiment, is embodied as or otherwise controlled by the processor 112. In embodiments where the settings control panel unit 118 is embodied separately from the processor 112, the settings control panel unit 118 may be in communication with the processor 112. The settings control panel unit 118 may further be in communication with the memory 114, communication interface 116, and/or synchronization server, such as via a bus.

The synchronization server 120 may be embodied as various means, such as hardware, a computer program product comprising computer readable program instructions stored on a computer readable medium (e.g., the memory 114) and executed by a processing device (e.g., the processor 112), or some combination thereof and, in one embodiment, is embodied as or otherwise controlled by the processor 112. In some embodiments, the synchronization server 120 may comprise a stand-alone computing device(s) that may be in communication with other elements of the settings management service 102, user devices 104, and/or service providers over the network 110. The synchronization server 120 may be configured to handle communicating setting configurations and/or settings data packages among computing devices of the system 100 for synchronization purposes. In at least some embodiments, the synchronization server 120 may utilize SyncML (also referred to as "synchronization markup language" and Open Mobile Alliance Data Synchronization and Device Management") to facilitate platform-independent synchronization of setting configurations between user devices 104 and/or service providers.

Referring now to the user device 104, in an exemplary embodiment, each user device 104 includes various means, such as a processor 122, memory 124, communication interface 126, user interface 128, and settings management unit 130 for performing the various functions herein described. These means of the user device 104 as described herein may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory 124) that is executable by a suitably configured processing device (e.g., the processor 122), or some combination thereof.

The processor 122 may, for example, be embodied as various means one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof. In embodiments wherein the user device 104 is embodied as a mobile terminal 10, the processor 122 may be embodied as or otherwise comprise the controller 20. In an exemplary embodiment, the processor 122 is configured to execute instructions stored in the memory 124 or otherwise accessible to the processor 122. Although illustrated in FIG. 1 as a single processor, in some embodiments the processor 122 comprises a plurality of processors, which may operate cooperatively to execute various functions described herein.

The memory 124 may include, for example, volatile and/or non-volatile memory. Although illustrated in FIG. 1 as a single memory, the memory 124 may comprise a plurality of memories, which may include volatile memory, non-volatile memory, or some combination thereof. In this regard, the memory 124 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 124 may be configured to store information, data, applications, instructions, or the like for enabling the user device 104 to carry out various functions in accordance with exemplary embodiments of the present invention. For example, in at least some embodiments, the memory 124 is configured to buffer input data for processing by the processor 122. Additionally or alternatively, in at least some embodiments, the memory 124 is configured to store program instructions for execution by the processor 122. The memory 124 may comprise one or more databases that store information in the form of static and/or dynamic information. The stored information may include setting configurations and/or settings data packages for the user device 102 and/or for one or more services. This stored information may be stored and/or used by the settings management unit 130 during the course of performing its functionalities.

The communication interface 126 may be embodied as any device or means embodied in hardware, a computer program product comprising computer readable program instructions stored on a computer readable medium (e.g., the memory 124) and executed by a processing device (e.g., the processor 122), or a combination thereof that is configured to receive and/or transmit data from/to a remote device, such as the settings management service 102 and/or a service provider over the network 110. In at least one embodiment, the communication interface 126 is at least partially embodied as or otherwise controlled by the processor 122. The communication interface 126 may include, for example, an antenna, a transmitter, a receiver, a transceiver and/or supporting hardware or software for enabling communications with other entities of the system 100. The communication interface 126 may be configured to receive and/or transmit data using any protocol that may be used for communications between computing devices of the system 100. In this regard, the communication interface 126 may be configured to receive and/or transmit setting configurations and/or settings data packages from and/or to other devices of the system 100. The communication interface 126 may additionally be in communication with the memory 124, user interface 128, and/or settings management unit 130, such as via a bus.

The user interface 128 may be in communication with the processor 122 to receive an indication of a user input and/or to provide an audible, visual, mechanical, or other output to the user. As such, the user interface 128 may include, for example, a keyboard, a mouse, a joystick, a display, a touch screen display, a microphone, a speaker, and/or other input/output mechanisms. The user interface 128 may accordingly provide means for presenting an interface to a user to configure one or more settings, such as through display of a graphical user interface, such as may be provided by the settings management service 102 and/or a service provider on a display. The user interface 128 may be in communication with the memory 124, communication interface 126, and/or settings management unit 130, such as via a bus.

The settings management unit 130 may be embodied as various means, such as hardware, a computer program product comprising computer readable program instructions stored on a computer readable medium (e.g., the memory 124) and executed by a processing device (e.g., the processor 122), or some combination thereof and, in one embodiment, is embodied as or otherwise controlled by the processor 122. In embodiments where the settings management unit 130 is embodied separately from the processor 122, the settings management unit 130 may be in communication with the processor 122. The settings management unit 130 may further be in communication with the memory 124, communication interface 126, and/or user interface 128, such as via a bus.

In some embodiments, the system 100 may comprise a portion of a system for providing a plurality of services to users of computing devices, such as, for example, a user device 104. Access to the plurality of services may be provided and/or controlled by an account management provider 302. In this regard, and referring now to FIG. 3, an embodiment of a system 300 for providing a plurality of services, including settings configuration synchronization, to computing devices in accordance with aspects of the present invention is illustrated. The system 300 may include an account management provider 302 in addition to the elements of the system 100. In this regard, the settings management service 102, one or more user devices 104, the plurality of service providers (e.g., service provider X 106 and service provider Y 108), and the account management provider 302 may be interconnected or may otherwise communicate with each other via the illustrated network 108.

The account management provider 302 may comprise any computing device or plurality of computing devices configured to (e.g., through specially configured hardware, such as, an appropriately configured processor, and/or through specially configured software, such as may be executed by a processor) provide a single service sign-on and/or interface to a plurality of services and/or service providers such that a user of a computing device may access a plurality of services through a single integrated account interface provided by the account management provider 302. In some embodiments, the account management provider 302 may further provide for common billing for access to or use of a plurality of services. Accordingly, in an exemplary embodiment, the account management provider 302 comprises a service provider in that the account management provider 302 provides a gateway to a plurality of services. An example of the functionality that may be provided by an account management provider 302 may be found at Nokia's www.ovi.com. Accordingly, a user of a computing device may be able to access settings management service 102 and/or settings management services provided by the settings management service 102 through the account management provider 302. Users may register computing devices, such as, for example, a user device 104, with the account management provider 302 such that the user may access services from the account management provider 302 using a user device 104. These services may be provided by the settings management service, a service provider, and/or the account management provider 302.

Accordingly, a user of a user device 104 may register or otherwise interface a user device 104 with the account management provider 302. Subsequent to registering a user device 104 with the account management provider 302, a user may log into the account management provider 302 and access one or more services, configure settings, and/or synchronize setting configurations as described herein in connection to the system 100. The user device 104 may comprise software configured for accessing the account management provider 302 and/or services provided by service providers, such as may be accessed through the account management provider 302. Such hardware and/or software may comprise, for example, a web browser, a dedicated application (e.g., a service-specific application), and/or the like.

Returning to FIG. 1, the settings control panel unit 118 is configured in at least some embodiments to provide one or more user interfaces facilitating a user of a user device 104 to configure one or more settings for a service(s). The construct of a user interface (UI) may be provided or specified by a service provider. In this regard, the settings control panel unit 118 may comprise a user interface widget application programming interface ("UI widget API") that may facilitate service providers to create user interface widgets (UI widgets) for handling settings that may be accessed and configured by a user with a user device 104. In this regard, UI widgets specified by service providers may be used by the settings control panel unit 118 to present settings to users via the user interface 128 and/or settings management unit 130 of a user device 104 for configuration. Each UI widget may, for example, comprise a web UI that may comprise a website or plug-in that may be accessible by a user device 104 over the network 110, such as with a web browser. In some embodiments, the settings control panel unit 118 may provide a central UI, such as a web UI, through which one or more service UI widgets may be accessed by a user of a user device 104. Some service providers may provide multiple service UI widgets for a given service, each of which may be tailored for a specific use scenario (e.g., dependent upon a location of a user device 104, identity of a user using user device 104 accessing the service UI widget, or other criteria).

Accordingly, for example, a user of a user device 104 may navigate to and/or otherwise access a central UI provided by the settings control panel unit 118, select a service UI widget for a service, and configure one or more settings using the service UI widget. The service provider providing the service UI widget and/or the settings control panel unit 118 may be configured to handle any error and validation checks for settings configured via the selected service UI widget. When a service UI widget is not available for a service requested by a user, the settings control panel unit 118 may be configured to generate a failure or other error message and send the message to the user device 104 such that it may be presented to the user over the user interface 128.

Figure 4:
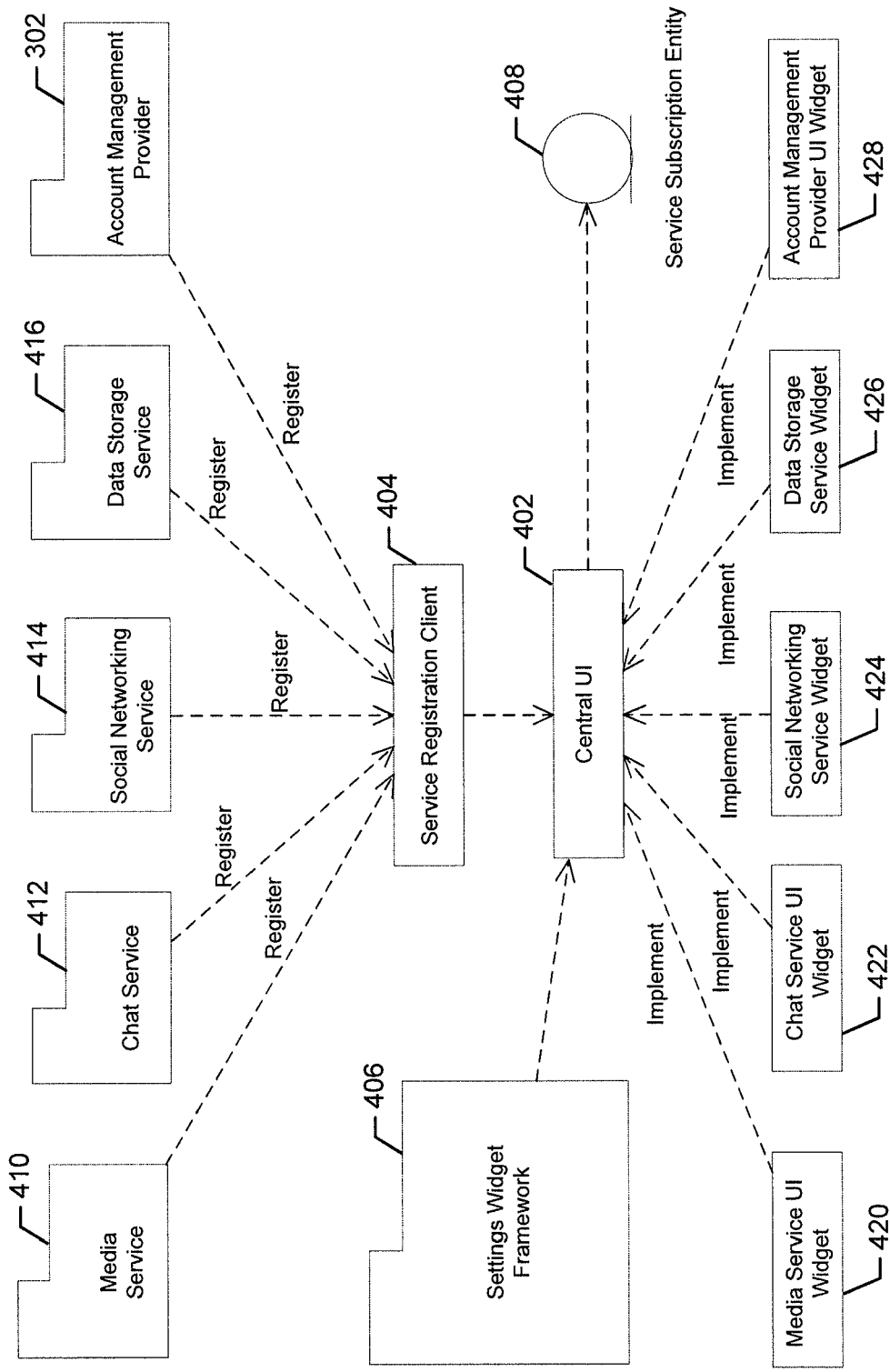
FIG. 4 illustrates a diagram of a plurality of services registering with a settings management service according to an exemplary embodiment of the invention.

In at least some embodiments, service providers integrating their services with the settings management service 102 so as to enable centralized settings configuration and/or settings synchronization according to embodiments of the present invention may register with the settings management service 102 and/or with an account management provider 302. FIG. 4 illustrates a diagram of a plurality of services registering with the settings management service 102 according to an exemplary embodiment of the invention such that the settings management service may implement and/or provide each service's service UI widget. In this regard, the settings control panel unit 118 may be configured to provide a service registration client 404 that facilitates service providers, such as, for example, the media service provider 410, chat service provider 412, social networking service provider 414, data storage service provider 416, and account management provider 302 illustrated in FIG. 4 to specify service UI widget information. Service providers may, for example, provide the service registration client 404 settings names, settings types, a uniform resource locator (URL) for a service provided by the service provider, a name of the service, a description of the service, a service UI widget, a URL for a service UI widget that the settings control panel unit 118 may access to provide the service UI widget to a user, authentication information for the service (e.g., authorization and/or login information enabling the service provider to access and specify the settings information and/or service UI widget(s) that it has registered to the settings management service 102), and/or the like. Once a service provider has registered with the settings management service 102, the service registration client 404 may be further configured to provide an interface enabling service providers to update and/or delete settings information and/or service UI widgets that the service provider previously specified. Additionally, the service registration client 404 may be configured to provide an interface enabling service providers to unregister from the settings management service 102.

Once a service provider has registered a service to the service registration client 404 and configured a service UI widget, the service UI widget may be accessed by a user of a user device 104 from the central UI 402. Referring to the example of FIG. 4, a media service provider 410, chat service provider 412, social networking service provider 414, data storage service provider 416, and account management provider 302 have registered with the service registration client 404 and configured, respectively, the media service UI widget 420, chat service UI widget 422, social networking service widget 424, data storage service widget 426, and account management provider UI widget 428. A user of a user device 104 may access one of these service UI widgets via the central UI 402 and configure one or more settings for the respective service with which the service UI widget is associated.

The settings control panel unit 118 and/or memory 114 may be configured to implement a settings widget framework 406 configured to allow a plurality of service UI widgets for various services to be stored collectively, such as in memory 114. The settings widget framework 406 may further be configured to provide for implementation of the plurality of service UI widgets such that, for example, a user of a user device 104 may access a respective service UI widget to configure a setting. In this regard, the settings widget framework 406 may provide a plug-in architecture facilitating implementation of a plurality of service UI widgets. The settings control panel unit 118 may additionally be configured to implement a service subscription entity 408, which may interface with the central UI 402 to provide the appropriate service UI widget to the central UI 402 when a particular service UI is to be rendered. In this regard, the service subscription entity 408 may be configured to manage a plurality of service UI widgets for service providers that have registered with the service registration client 404 and configured a service UI widget.

Security Policy Enforcement by Some Embodiments of the Invention

Figure 3:
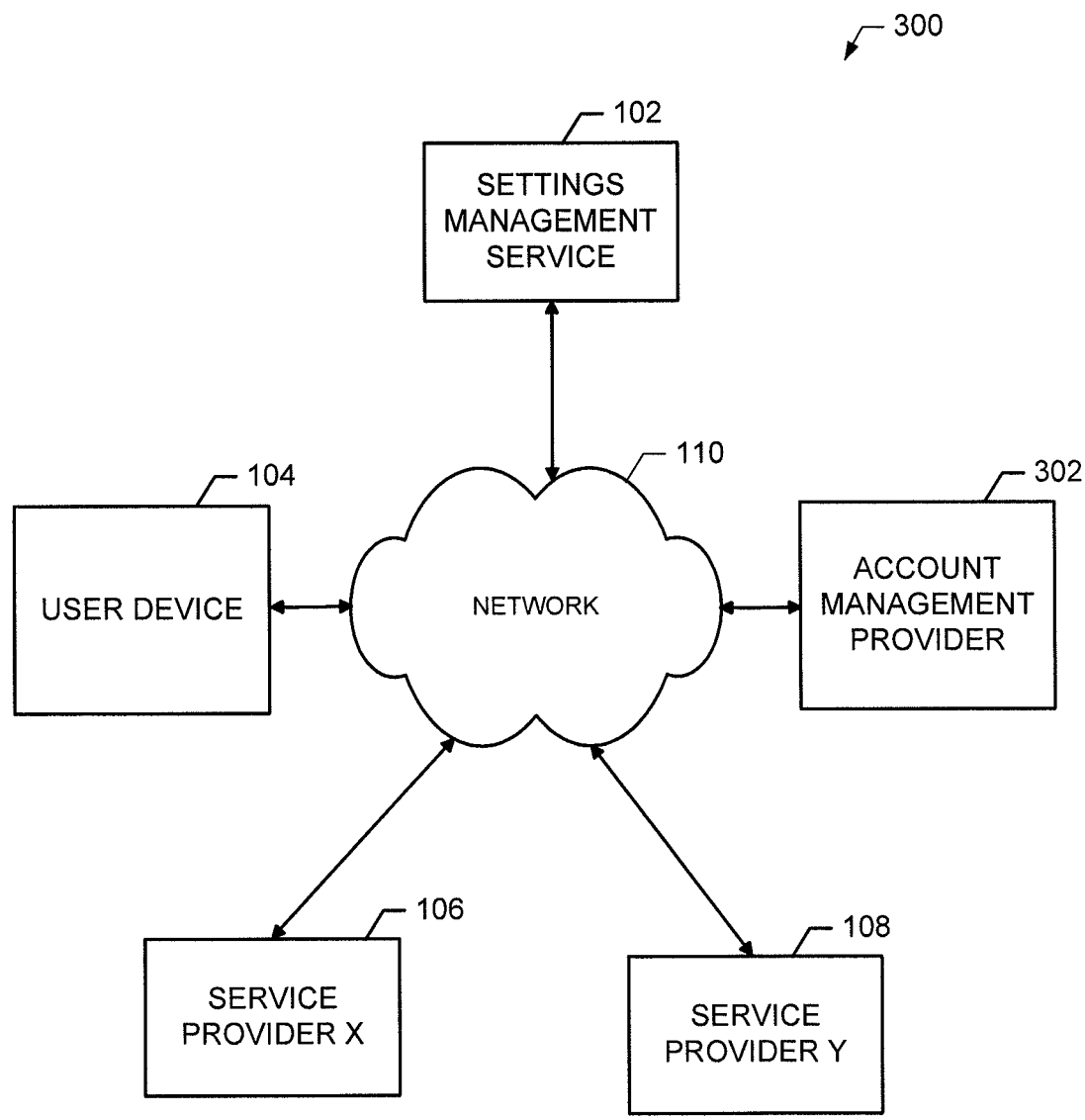
FIG. 3 illustrates a block diagram of a system for providing a plurality of services to computing devices according to an exemplary embodiment of the present invention.

In embodiments wherein the system 100 comprises a portion of a system for providing a plurality of services to users of computing devices and having an account management provider 302, such as illustrated in FIG. 3, the settings management service 102 and each service provider may implement a security and/or sign-on protocol in accordance with a protocol specified by the account management provider 302. In this regard, the account management provider 302 may control or otherwise facilitate access to the settings management service 102 by both user devices 104 and service providers. Each service provider and/or user of a user device 104 may have unique sign-on information so as to access the settings management service 102, which may comprise, for example, a consumer key and consumer secret (e.g., in accordance with OAuth signing). Thus, a service provider and/or a user device 104 may invoke the settings management service 102 in the role of a consumer of settings.

In some embodiments, consumers of the settings management service may possess an "access token," which may comprise a tuple with information. Consumers may further possess a "token secret" that is associated with the access token and/or a "consumer secret" unique to the consumer.

The account management provider 302 may store or have access to a copy of the access token, token secret, and/or consumer secret to facilitate sign-on and verification of a consumer. The access token may bind an authenticated user session (e.g., a user session of the account management provider 302) to a consumer (e.g., a user of a user device 104, a user device 104, service provider, or the like) and a service (e.g., the settings management service 102). The consumer may then present the access token to the settings management service 102 when it invokes the settings management service. The settings control panel unit 118 may be configured to dereference the access token and send it to the account management provider 302. The account management provider 302 may be configured to use the access token to retrieve information about the authenticated user, the associated consumer key, and associated token secret and send this information to the settings management service 102. This information may then be used for validation of the consumer by the settings management service 102, as the access token, itself, is not secret and on its own should not be considered sufficient for resource access in embodiments wherein a secure access policy is enforced by an account management provider 302 or by the settings management service 102. Accordingly, when the consumer sends any settings management service request message (e.g., to change a configuration setting, set up a service UI widget, and/or the like) to the settings management service 102, the consumer may sign the message with the token secret and/or the consumer secret. The settings control panel unit 118 may then verify the authenticity of the settings management service request message by using the token secret and consumer secret obtained from the account management provider 302 to authenticate the settings management service request message (e.g., to ensure that the token secret and consumer secret used to sign the message by the consumer are the same as those provided to the settings management service 102 by the account management provider 302 and known to be authentic).

Synchronization of Setting Configurations

In at least some embodiments, a user of a user device 104 may access a settings configuration user interface, such as a central UI widget and/or a service UI widget provided by the settings management service 102 and/or a service provider. This user interface may be retrieved by the settings management unit 130 over the network 110 from the settings management service 102 or may be locally available in the memory 124, such as when the user device 104 is not actively connected to the network 110. The user may then use the user interface 128 to provide input to the user device 104 to configure one or more settings. Once the user has completed configuration of a setting(s), the settings management unit 130 may be configured to generate a settings data package comprising a setting configuration newly configured or changed by the user such that notice of the setting configuration may be sent to the settings management service 102.

In some embodiments, the user may additionally explicitly designate one or more services and/or one or more other user devices 104 (e.g., other user devices 104 owned or used by the user) that the user would like the newly configured setting configuration(s) to be synchronized to. Additionally or alternatively, such designation may be based on existing account settings of the user (e.g., an account with the account management provider 302 and/or with the settings management service 102) and/or based on a service provider associated with a setting configured by the user. The settings management unit 130 may accordingly be further configured to generate the settings data package to comprise an indication of user devices 104 and/or service providers to which the settings management service 102 is to synchronize the setting configuration contained in the settings data package.

In an exemplary embodiment, the settings data package comprises an extensible markup language (XML)-based package. This package may comprise a plurality of fields that provide routing information to enable the settings management service 102 to synchronize a setting configuration contained in the settings data package to another user device 104 and/or to a service provider. One such field may comprise a "globally unique identification" (GUID) field, which may comprise a unique identity to identify a setting corresponding to the setting configuration contained in the settings data package. In this regard, the settings management service 102 may assign a unique identity to each setting that may be configured through the settings management service. Another field may comprise a "Device" field, which may comprise a unique identification of a user device 104 to which a settings data package is to be sent for synchronization by the settings management service. The settings control panel unit 118 and/or synchronization server 120 may utilize the device field for routing purposes. The settings data package may additionally or alternatively comprise an "address" field, which may comprise a unique identifier identifying a service provider to which a settings data package is to be sent for synchronization by the settings management service. The settings control panel unit 118 and/or synchronization server 120 may accordingly utilize the address field for routing purposes. The settings data package may also comprise a field that facilitates a service provider's handling of a setting configuration included in the settings data package. For example, this field may identify a specific service provided by the service provider (this identity may be unique for each service and may be agreed upon between the settings management service 102 and service provider providing the service), a version of the service (if applicable), and an identity of a user to which the setting configuration is to be applied as known to the service. The settings data package may further comprise a "last modified" field, which may comprise a time stamp indicating when the setting configuration in the setting data package was configured, which can be used by the settings management service 102, a user device 104, and/or a service provider to aid in synchronization of setting configurations. In this regard, if an entity of the system 100 has a locally stored setting configuration more recent that that contained in a received settings data package, the locally stored setting configuration should not be replaced with the older setting configuration included in the settings data package.

An example settings data package may be formatted in XML as follows:

```
<setting>
<guid>435235</guid>
<device>Nokia N95</device>
<address>1.0/Phone-settings/daniel</address>
<lastmodified></lastmodified>
<settingdata>
phone-theme=my_theme
</settingdata>
</setting>
```

Once the settings management unit 130 has generated a settings data package, it may be at least temporarily stored in the memory 124 prior to the settings management unit 130 sending the settings data package to the settings management service 102. The settings management unit 130 may be configured to send the settings data package automatically following generation and/or in response to a request of a user of the user device 104. The settings management unit 130 may additionally or alternatively be configured to send the settings data package to the settings management service 102 at a scheduled synchronization time, which may comprise a time at which any settings data packages generated by the settings management unit 130 and stored in the memory 124 that have not previously been sent to the settings management service 102 are sent to and/or retrieved by the settings management service. Additionally or alternatively, the settings management unit 130 may be configured to receive a request from the settings management service 102 (e.g., from the settings control panel unit 118 and/or synchronization server 120) to send any previously unsent settings data packages to the settings management service 102 for synchronization and to send unsent settings data packages in response to the request. In some embodiments, the settings management unit 130 may be configured to detect if an active network connection between the user device 104 and the network 110 is available and send an unsent settings data packet when a connection is available. An available connection may comprise a communications session between the user device 104 and a remote network device (e.g., a phone call with another device, text messaging another device, a peer-to-peer data transfer session, instant message session, and/or the like).

In some embodiments, the settings management unit 130 may comprise a synchronization client, which may be configured to communicate with the synchronization server 120 and/or settings control panel unit 118 to enable sending settings data packets to and/or receiving settings data packets from the settings management service 102. Accordingly, sending a settings data package to the settings management service may comprise a synchronization client sending the settings data package. The synchronization client may be configured to send and receive settings data packages using SyncML, such as in embodiments wherein the synchronization server 120 utilizes SyncML.

In at least some embodiments, the settings management unit 130 is configured to receive a settings data package (e.g., a settings data package generated by the settings control panel unit 118) from the settings management service 102. Receipt of a settings data package may be handled by a synchronization client and the settings data package may be received from the synchronization server 120. The settings data package may be formatted in accordance with the format previously outlined and thus may comprise a setting configuration and/or an identified service(s) with which the setting configuration is associated. Upon receipt of the settings data package, the settings management unit 130 may determine the service(s) identified by the settings data package. The settings management unit 130 may then, if applicable, route the settings data package to an appropriate service handler entity (e.g., a service-specific application, web browser, settings management service widget, and/or the like) embodied on the user device 104 that is used to locally access and/or implement the identified service on the user device 104. The settings management unit 130 and/or the service handler entity may then extract the setting configuration contained in the settings data package and implement the extracted setting configuration on the user device 104.

The settings management unit 130 may be further configured to store the extracted setting configuration and/or the settings data package in the memory 124 for later referencing and/or implementation by the settings management unit 130 and/or by the appropriate service handler entity. In this regard, the settings data package and/or setting configuration extracted from therein may be stored in a settings management service settings store (e.g., in memory 124) in association with the service identified by the settings data package. The service handler entity used to access the service with which the stored setting configuration is implemented may then access the setting configuration from the settings management service settings store when the user of the user device 104 accesses the particular service (e.g., to implement the setting configuration).

In some embodiments wherein a settings data package received by the settings management unit 130 comprises a last modified field with timestamp, the settings management unit 130 may be configured to compare the timestamp of the settings data package to a timestamp associated with a configuration for the setting identified by the GUID that is currently implemented on the user device 104 to ensure that the received settings data package comprises a setting configuration more current than any existing configuration for the setting prior to implementing the received setting configuration.

In at least some embodiments, the synchronization server 120 and/or the settings control panel unit 118 is configured to receive and/or retrieve a settings data package from a user device 104. Upon receipt of the settings data package, the settings control panel unit 118 may be configured to extract data from data fields included in the settings data package (e.g., from a device field, address field, and/or the like) and use the extracted information to synchronize the setting configuration included in the settings data package to a service provider and/or user device 104 identified in the settings data package by distributing the settings data package to a service provider and/or user device 104 identified in the settings data package. In order to distribute the settings data package for synchronization, the settings control panel unit 118 may be configured to forward the settings data package to the synchronization server 120 for distribution. The synchronization server 120 may then utilize routing information provided by the settings control panel unit 118 and/or extract destination data from the settings data package itself prior to distributing the settings data package to a destination user device 104 and/or destination service provider. Distributing the settings data package to a service provider may comprise sending the settings data package to a server computing device providing the service.

In some embodiments wherein a settings data package received by the settings control panel unit 118 comprises a last modified field with timestamp, the settings control panel unit 118 may be configured to compare the timestamp contained by the settings data package to a timestamp associated with a configuration for the setting identified by the GUID that is currently known and implemented by the settings management service 102 and/or the associated service provider to ensure that the received settings data package comprises a setting configuration more current than any existing configuration for the setting prior to synchronizing the received setting configuration by distributing the settings data package. In this regard, the memory 114 or other memory accessible to the settings control panel unit 118 may comprise a service settings database containing a settings management service settings store for the configuration of the setting identified by the GUID and the settings control panel may compare the timestamp of the settings data package to the timestamp of the stored configuration for the setting. The stored configuration(s) may each be uniquely associated with a particular user and/or user device 104 and thus the settings control panel unit 118 may be configured to look up the appropriate stored configuration based at least in part upon a user and/or user device 104 identified in the settings data package.

In at least some embodiments, the settings control panel unit 118 is configured to provide a user interface (e.g., a central UI and/or a service UI widget as described above) to facilitate a user of a user device 104 to configure one or more settings. Accordingly, the settings control panel unit 118 may be further configured to receive, via the user interface, an indication of a configuration of a setting made by the user. The configuration of the setting comprises a setting configuration. In response to receipt of the indication of a configuration of a setting, the settings control panel unit 118 may be configured to generate a settings data package comprising the setting configuration. The settings data package generated by the settings control panel unit 118 may be in accordance with the settings data package format described above and may comprise any one or more of the described fields. Accordingly, for example, the settings control panel unit 118 may include an address of a service provider with which the setting is associated, the GUID of the setting, information enabling the service provider to handle the setting configuration (e.g., an identity of the user and/or user device 104 that configured the setting using the user interface), a timestamp indicating when the configuration was made and/or when the settings data package was generated, and/or an identification of a user device 104 (e.g., another user device 104 associated with the user that configured the setting to which the user wants the setting configuration synchronized). The information included in these fields by the settings control panel unit 118 may be obtained from the user interface used to configure the setting, from further input by the user, and/or from predefined user preferences, such as may be stored in the memory 114.

The settings control panel unit 118 may then forward the settings data package to the synchronization server 120, which may synchronize the setting configuration to a service provider and/or a user device 104 by distributing the settings data package to a service provider and/or user device 104 (e.g., a service provider and/or user device 104 identified by the settings data package). The synchronization server 120 may utilize SyncML for distribution of settings data packages.

Figure 5:
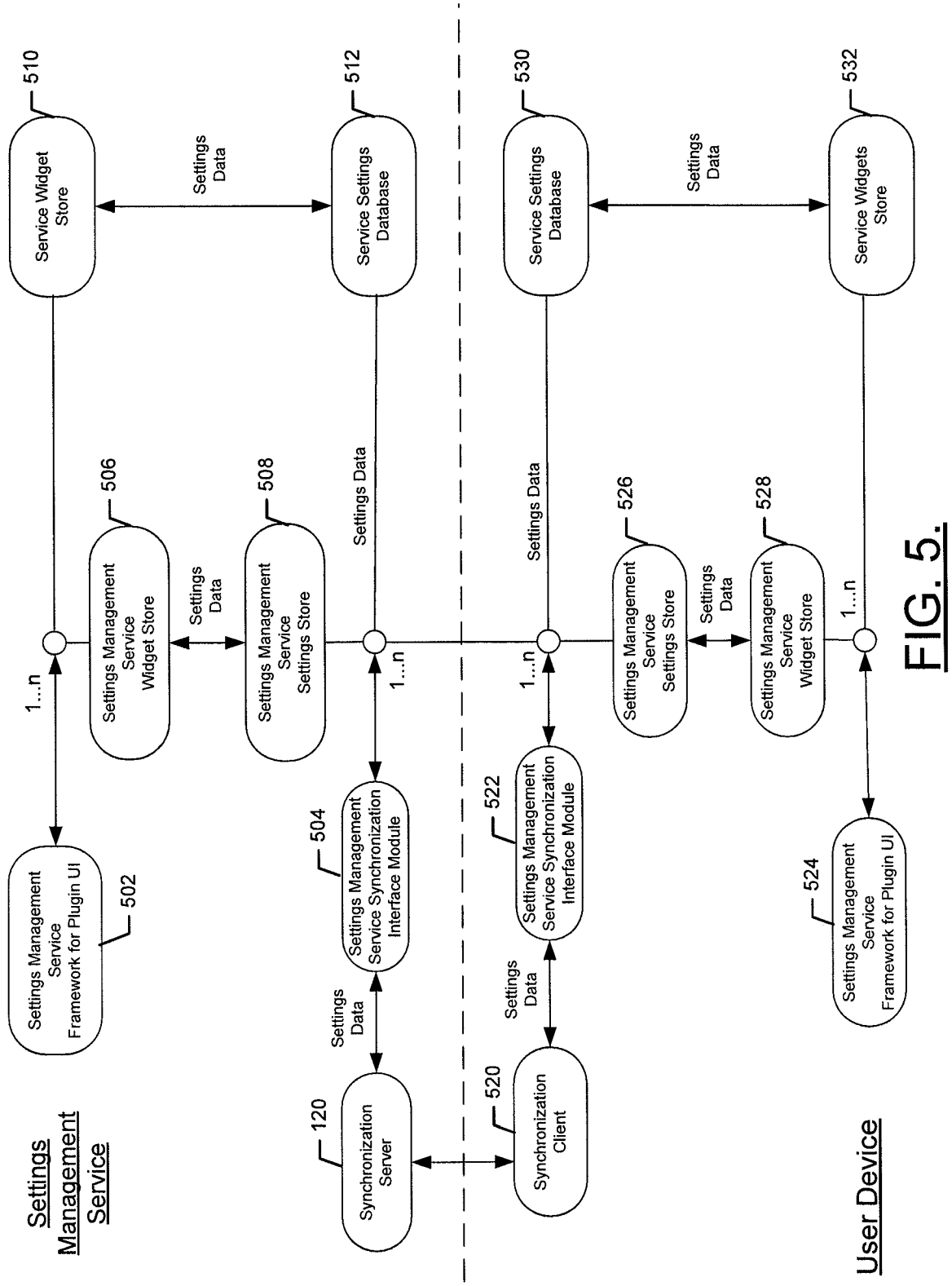
FIG. 5 illustrates an exemplary embodiment of a mirror image architecture facilitating two endpoints to connect for transmission of a settings data package.

In some embodiments, the settings management service 102 and user device 104 may comprise a mirror image architecture that allows two endpoints (e.g., the settings management service 102 and a user device 104) to connect for transmission of a settings data package between endpoints for synchronization purposes. The architecture on the user device 104 side may be implemented by the settings management unit 130 and memory 124. The architecture on the settings management service 102 may be implemented by the memory 114, settings control panel unit 118, and synchronization server 120. FIG. 5 illustrates an exemplary embodiment of a mirror image architecture facilitating two endpoints to connect for transmission of a settings data package.

Referring to FIG. 5, the settings management service-side architecture may comprise a settings management service framework for plugin UI 502, which may comprise the service registration client 404 and/or central UI 402 and which may facilitate the provision of a service UI widget to a user of a user device 104. Setting configurations managed by the settings management service 102 may be stored in a settings management service settings store 508 (e.g., in memory 114). Each setting configuration may be stored in association with the service provider(s), user, and/or user device 104 with which the setting configuration is associated. Additionally or alternatively, a setting configuration may be stored by and accessed from service provider with which the setting configuration is related. In this regard, a service provider may store settings configurations in a service settings database 512 managed by the service provider. The settings management service synchronization interface module 504 may be configured to receive settings data packages from and/or forward settings data packages to the synchronization server 120. The service UI widgets may be stored in a settings management service widget store 506 (e.g., in memory 114). Additionally or alternatively, a service UI widget may be stored by and accessed from the respective service provider that configured the service UI widget. In this regard, a service provider may store a service UI widget in a service widgets store 510 managed by the service provider.

On the user device 104 side of the architecture of FIG. 5, the user device 104 may comprise a synchronization client 520, which may be implemented and/or controlled by the settings management unit 130, which may receive settings data packages from and/or send settings data packages to the synchronization server 120. The settings management service synchronization interface module 522 may facilitate handling of received settings data packages, such as by saving them in the memory 124 and/or forwarding the settings data package to an appropriate service handler entity (e.g., an appropriate settings management service widget 528). The settings management service synchronization interface module 522 may additionally or alternatively facilitate handling of settings data packages to be sent by the synchronization client 520, such as by retrieving unseat settings data packages from the memory 124.

Setting configurations may be locally stored at the user device (e.g., in memory 124) in a settings management service settings store 526. Additionally or alternatively, a setting configuration may be stored by and accessed from the service provider with which the setting configuration is related. In this regard, a service provider may store setting configurations in a service settings database 530 managed by the service provider. One or more service UI widgets may be stored locally at the user device (e.g., in memory 124) in a settings management service widget store 528. Additionally or alternatively, a service UI widget may be stored by and accessed from the respective service provider that configured the service UI widget. In this regard, a service provider may store a service UI widget in a service widgets store 532 managed by the service provider.

The settings management unit 130 may further comprise a settings management service framework for plugin UI 524, which may facilitate a user's access of a user interface (e.g., a central UI and/or service UI widget) to configure a setting. The settings management service framework for plugin UI 524 may work with the settings management service framework for plugin UI 502 of the settings management service 102 to facilitate providing a user interface for configuring a setting to a user when the user device 104 has an established connection. Additionally or alternatively, the settings management service framework for plugin UI 524 may load a locally stored user interface, such as a service UI widget 532 from the memory 124, such as when the user device 104 is not connected to the network 110. In this regard, a user may, in some embodiments, configure a setting in both online and offline modes.

The settings management unit 130 may maintain a services settings database 530 (e.g., on memory 124), which may comprise currently implemented setting configuration (e.g., for the user device 104 and/or services accessed with the user device 104). The settings management unit 130 may additionally or alternatively maintain a settings management service settings store 526 in association with each service accessed by the user device 104, which may comprise implemented setting configurations for that service. Accordingly, when a service is accessed on the user device 104, the settings management unit 130 may retrieve the appropriate setting configurations for the service.

Configuring Settings for Multiple Services

FIG. 6A through 6E illustrates a series of user interfaces that may be presented to a user when using a settings management service to configure a setting. Each of the user interface screens described herein may be presented to the user by the settings control panel unit 118, by an account management provider 302, and/or by the settings management unit 130 and may be viewed by the user via the user interface 128. The user interface may comprise an initial main control panel screen (FIG. 6A) from which the user may select a plurality of options. One option may be to configure settings (labeled "OVI Settings" in FIG. 6A). If the user selects the option to configure settings, the user may be presented with a second user interface screen (FIG. 6B), which may list a plurality of setting categories. The user may select any of the displayed categories to configure settings falling within that category.

One such category that may be available to the user is a general user account category (e.g., "My Account), which may comprise general settings applicable to the user's global account with the settings management service 102 and/or account management provider 302. These settings may be applied to multiple services accessed by the user and may comprise, for example, user biographic details, privacy, and marketing settings. FIG. 6C illustrates a user interface for configuring basic user biographic detail settings, which may comprise, for example, a user name, user online handle, user address, user language preferences, user email address, services to which the user has subscribed (e.g., for synchronization of the setting configurations to the service), and/or the like. FIG. 6D illustrates an alternative user interface for configuring basic user biographic detail settings, such as may be provided to a user of a mobile user device 104 having a smaller display screen than, for instance, a desktop user device 104.

Figure 6B:
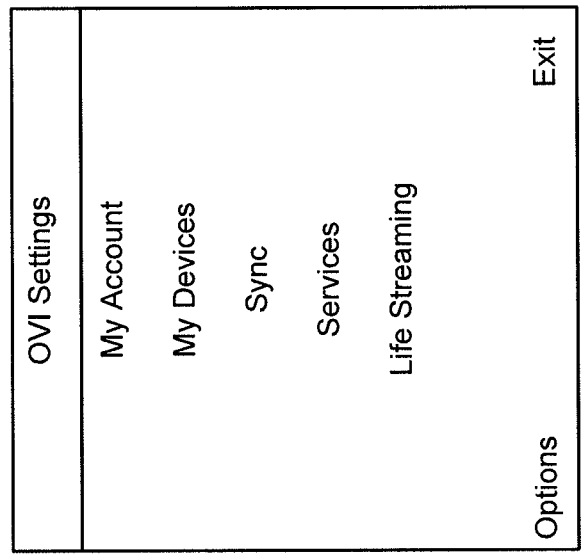
Figure 6A:
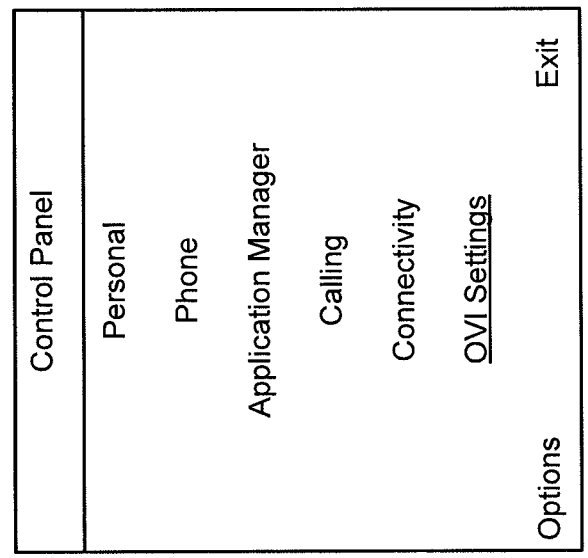
Figure 6F:
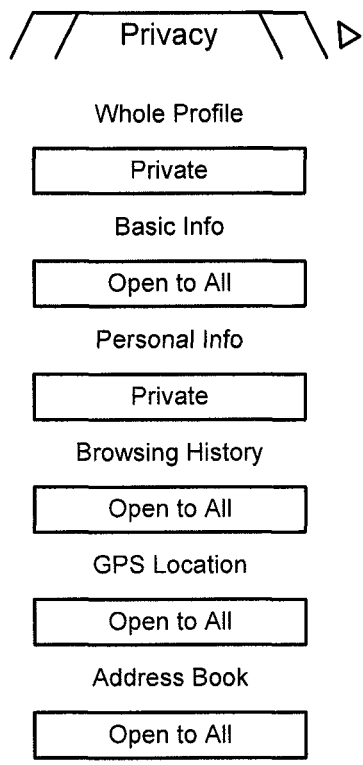

FIG. 6E illustrates a user interface through which a user may configure privacy settings that may be applicable to multiple services. For example, a user's user device 104 may comprise a positioning sensor, such as a Global Positioning System device, which may provide location information to the settings management service 102 and/or an account management provider 302. Accordingly, the user may configure a setting defining what individual users and/or service providers may access the user's current GPS location. One such setting may be "open to all." Other such privacy settings may include, for example, the availability of user profile data, user personal information, user browsing history, user address book, and/or the like. The user interface may further allow the user to configure preferred marketing and notification settings, which may define what modes of communication (e.g., email, text message, phone call, and/or the like) that a service provider may utilize to contact and/or to send marketing information to the user. The user may further configure what services may send the user marketing information and/or what type of marketing information a service(s) may send to the user. FIG. 6F illustrates an alternative user interface through which a user may configure privacy settings that may be applicable to multiple services, such as may be provided to a user of a mobile user device 104 having a smaller display screen than, for instance, a desktop user device 104.

Figure 7:
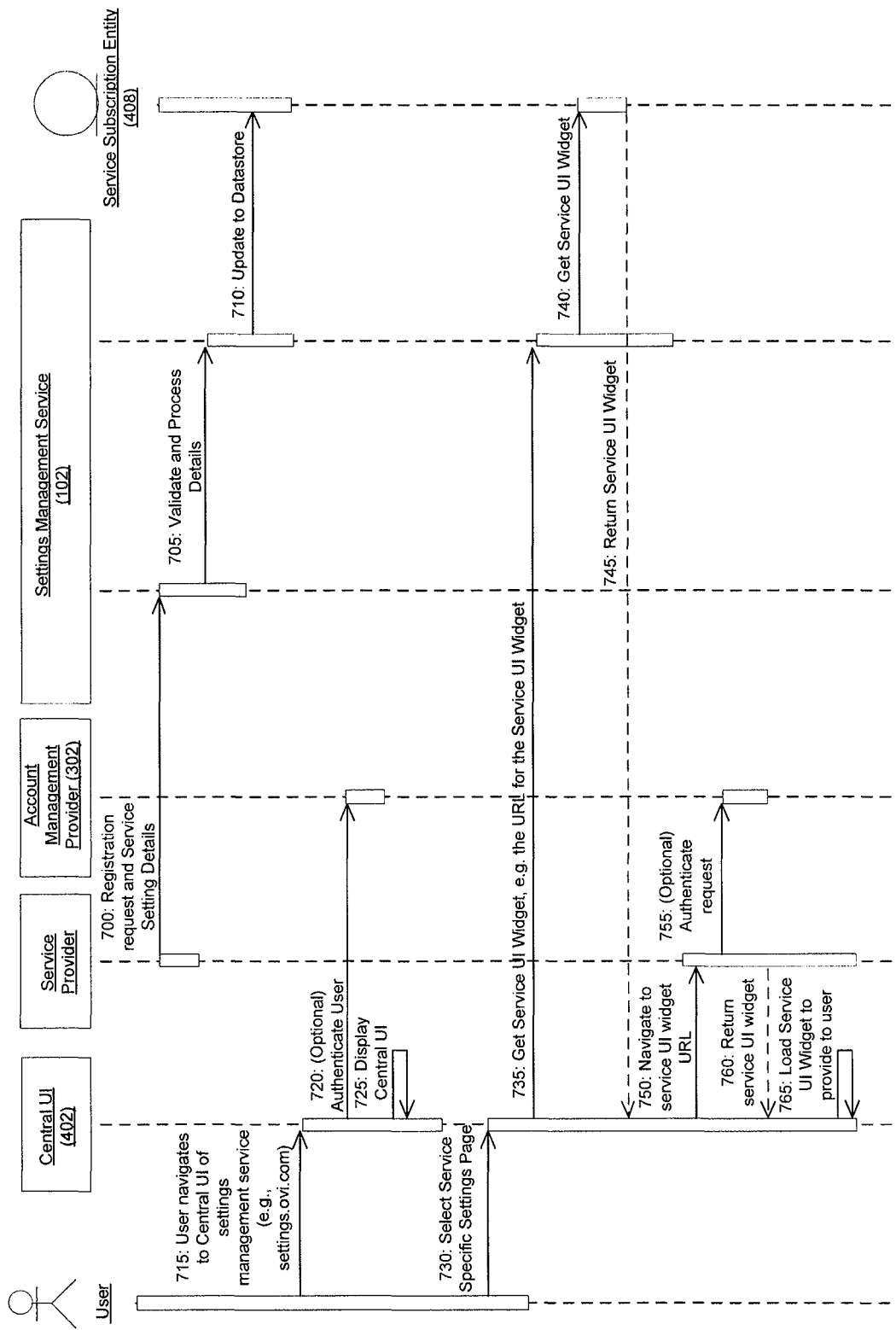
FIG. 7 illustrates a timing diagram illustrating data that may be exchanged during registration of a service provider to a settings management service and during user access of a user interface to configure service settings according to an exemplary embodiment of the invention.

FIG. 7 illustrates a timing diagram illustrating data that may be exchanged during registration of a service provider to a settings management service and during user access of a user interface to configure service settings according to an exemplary embodiment of the invention. In this regard, operations 700-710 illustrate the registration of a service provider and implementation of a service UI widget as previously described. Operation 700 may comprise a service provider sending a registration request to the settings management service 102 (e.g., to the service registration client 404). The registration request may comprise, for example, settings names, settings types, a URL for a service provided by the service provider, a name of the service, a description of the service, a service UI widget, a URL for a service UI widget that the settings control panel unit 118 may access to provide the service UI widget to a user, authentication information for the service (e.g., authorization and/or login information enabling the service provider to access and specify the settings information and/or service UI widget(s) that it has registered to the settings management service 102), and/or the like. Operation 705 may comprise the service registration client 404 validating and processing the details of the service UI widget provided by the service provider and/or generating a service UI widget from the information provided by the service provider. The service provider may further provide and/or negotiate with the service registration client 404 GUID for each setting associated with the service and/or identification information that may be included in a settings data packet (e.g., user identification information) that may facilitate the service provider to implement a setting configuration distributed to the service provider in a settings data packet. Operation 710 may comprise storing the new service UI widget and/or registration information for the service provider to the service subscription entity 408 (e.g., in memory 114), which may comprise a service UI widget and/or other service information for each service registered to the settings management service.

Once a service provider has registered a service to the service registration client 404 and configured a service UI widget, the service UI widget may be accessed by a user of a user device 104 from the central UI 402. For example, operation 715 may comprise a user of a user device 104 navigating to the central UI provided by the settings management service (e.g., settings.ovi.com). Operation 720 may, in some embodiments, optionally comprise the settings control panel unit 118 authenticating the user by retrieving authentication information from the account management provider as previously described. Operation 725 may comprise the settings control panel unit 118 providing the central UI to the user's user device 104 such that it is displayable on a display of the user interface 128. Operation 730 may comprise the user selecting a service specific settings page (e.g., for a registered service) from the central UI.

Operations 735 and 740 may comprise the settings control panel unit 118 retrieving the service UI widget for the selected service. In this regard, the settings control panel unit 118 may retrieve the actual service UI widget from the service subscription entity 408 or may retrieve a URL for the service UI widget. Operation 745 may comprise the settings control panel unit 118 providing the service UI widget or the service UI widget URL to the central UI 402 such that it may be provided to the user. If the settings control panel unit 118 provides the URL for the service UI widget, Operation 750 may comprise the settings control panel unit 118 navigating the central UI to the URL so that the service UI widget may be loaded. In some embodiments, operation 755 may optionally comprise the service provider authenticating the service UI widget request to the account management provider 302 (e.g., to authenticate settings management service 102 and/or to authenticate the user to whom the service UI widget will be provided). The service provider may then return the service UI widget, at operation 760.

Operation 765 may comprise the settings control panel unit 118 loading the service UI widget into the central UI 402 so as to provide the service UI widget to the user device 104 such that it is displayable by the user device 104 and the user may configure one or more settings using the service UI widget.

Configuring Settings for a Service

FIG. 8 illustrates a user interface that may be presented to a user when using the settings management service 402 to select a service and configure a setting for the service according to an exemplary embodiment of the invention. The user interface illustrated in FIG. 8 and described herein may be presented to the user by the settings control panel unit 118, by an account management provider 302, and/or by the settings management unit 130 and may be viewed by the user via the user interface 128.

A user may select a service from a plurality of services using the UI. The plurality of services may, for example, be presented as a horizontal navigation bar. Once the user has selected a service, the settings control panel unit 118 may retrieve the service UI widget for the selected service and present the retrieved service UI widget to the user by sending data to the user device 104 enabling the settings management unit 130 to render the service UI widget in a display of the user interface 128. In FIG. 8, the user has selected a data share service from a horizontal navigation bar and setting configurations for the data share service are illustrated. The user may configure one or more settings for the service using the UI. Upon configuration of a setting, the settings control panel unit 118 and/or the settings management unit 130 may generate a settings data package as previously described such that the new setting configuration may be synchronized to the service provider and/or to a user device 104 in accordance with any of the invention embodiments previously described.

Example settings that may be configured for a data share service as illustrated in FIG. 8 include, for example, a secret password for data uploads, notification preferences for when comments are made to the user's shared media, notifications for actions taken by the user's contacts, notifications when new members join the service, and/or the like. For example, if the user configures a notification setting to send the user an email notification when a comment is posted to the user's shared media, once the setting configuration is synchronized to the data share service, if a user posts a comment to the user's shared media, the data share service may send the user a notification email to an email address that the user has configured in an email setting. Other settings may control who may see the user's shared media and/or information about the user on the data share service. For example, the user's contacts may be configured to be shown only to the user, only to the user's contacts, or to all users of the data share service.

Configuring Synchronization and Backup Settings

FIG. 9 illustrates a user interface that may be presented to a user when using the settings management service 402 to configure synchronization and/or backup settings according to an exemplary embodiment of the invention. The user interface illustrated in FIG. 9 and described herein may be presented to the user by the settings control panel unit 118, by an account management provider 302, and/or by the settings management unit 130 and may be viewed by the user via the user interface 128.

In this regard, a user may register more than one user device 104 to the settings management service 102, such that setting configurations may be synchronized between multiple user devices 104 associated with the user. The user may then select user devices 104 to which setting configurations are to be synchronized (e.g., a Nokia N95, Nokia N81, personal desktop computer, work desktop computer, and/or the like) and/or types of setting configurations to be synchronized to a user device 104. Further, a user may categorize various settings (e.g., as business settings, personal settings, work settings, etc) and then configure for each user device 104 associated with the user what category or categories of setting configurations are to by synchronized to the user device 104. The user may further configure when synchronizations should be take place (e.g., a specific time, periodically, when the user's user device 104 is engaged in active communication with another device over the network 110, at the user's command, automatically following configuration of a setting, and/or the like). The user may also configure a direction of synchronization for each user device 104 (e.g., synchronize in both directions, only synchronize from settings management service 102 to user device 104, only synchronize from the user device 104 to the settings management service 102, synchronize from first user device 104 to second user device 104, and/or the like). The user may further configure conflict resolution between different setting configurations so that the settings control panel unit 118 and/or settings management unit 130 may handle conflicting setting configuration in accordance with a user defined policy (e.g., use most recent, prefer setting configuration set by a first user device 104 over one set by a second user device 104, prefer setting configuration received from settings management service 102 over setting configuration in user device 104, and/or the like). Accordingly, a user may configure 'How, When, and What' details of synchronization between the settings management service, various service providers and/or user devices 104. The settings control panel unit 118 may then utilize the synchronization details to handle synchronization of setting configurations for the user.

A user may add (e.g., register in association with the user), manage or remove (e.g., unregister) a user device 104 so as to control user devices 104 for which the user may configure synchronization and/or backup settings. For example, referring to FIG. 8, the user may select the "My Devices" option to add, manage, or remove a registered user device 104.

For example, a user may wish to synchronize his calendar and contact data to all of his user devices 104. Accordingly, in one embodiment, contact information can be synchronized from services registered to the settings management service 102 to the user's user devices 104. Accordingly, the settings control panel unit 118 may be configured to synchronize, based at least in part upon the user's configuration settings, data entered by the user into a contacts service and/or calendar service, to the user's user devices 104 as specified by the user's synchronization setting configurations. Thus, assuming a user adds contacts to a list of contacts in a contacts service and wants to synchronize this information to all his associated user devices 104, but does not wish to synchronize any contacts added locally to a user device 104 to the contacts service, the user may, for example, configure the following settings:

Devices—All
Content—Contacts
Automatic—Synchronize every time I connect my device
Conflict resolution—Server wins
Direction—Only update Ovi Server to Ovi Device The settings control panel unit 118 and/or settings management unit 130 may further be configured to maintain and provide the user (e.g., upon user request) with a user interface showing a log of synchronizations that have been performed. The log file may comprise information about the time of a synchronization, direction of the synchronization, content of the synchronization, success of the synchronization, any conflict of the synchronization, resolution of a synchronization conflict, and/or any additional available details about the synchronization. The user may be able to configure settings detailing what information is maintained in the log file, when synchronizations in the log file may be purged (e.g., how long synchronization logs are maintained), where the log file should be stored, and/or the like.

Flow Charts According to Exemplary Embodiments of the Invention

FIGS. 10-15 are flowcharts of a system, method, and computer program product according to exemplary embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the instructions of the computer program product which execute on the computer or other programmable apparatus create means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture including instruction means which implement the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer program product(s).

Figure 10:
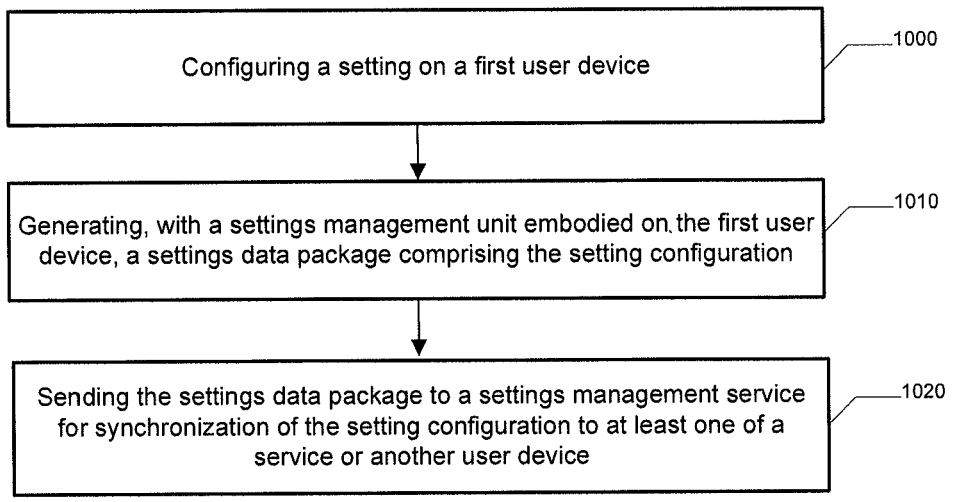
FIG. 10 illustrates an exemplary method for configuring a setting on a user device and synchronizing the setting configuration using a settings management service according to an exemplary embodiment of the present invention.

In this regard, one exemplary method for configuring a setting on a user device 104 and synchronizing the setting configuration using a settings management service 102 according to an exemplary embodiment of the present invention is illustrated in FIG. 10. In this regard, FIG. 10 illustrates operations that may occur at a user device 104. The method includes the settings management unit 130 receiving a user input indicating a configuration of a setting, such as over a user interface displayed by the user interface 128, and configuring the setting based at least in part upon the user input, at operation 1000. Operation 1010 may comprise the settings management unit 130 generating a settings data package comprising the new setting configuration. The settings management unit 130 may then send the settings data package to the settings management service 102 so that the setting configuration may be synchronized to another user device 104 and/or to a service, at operation 1020.

Figure 11:
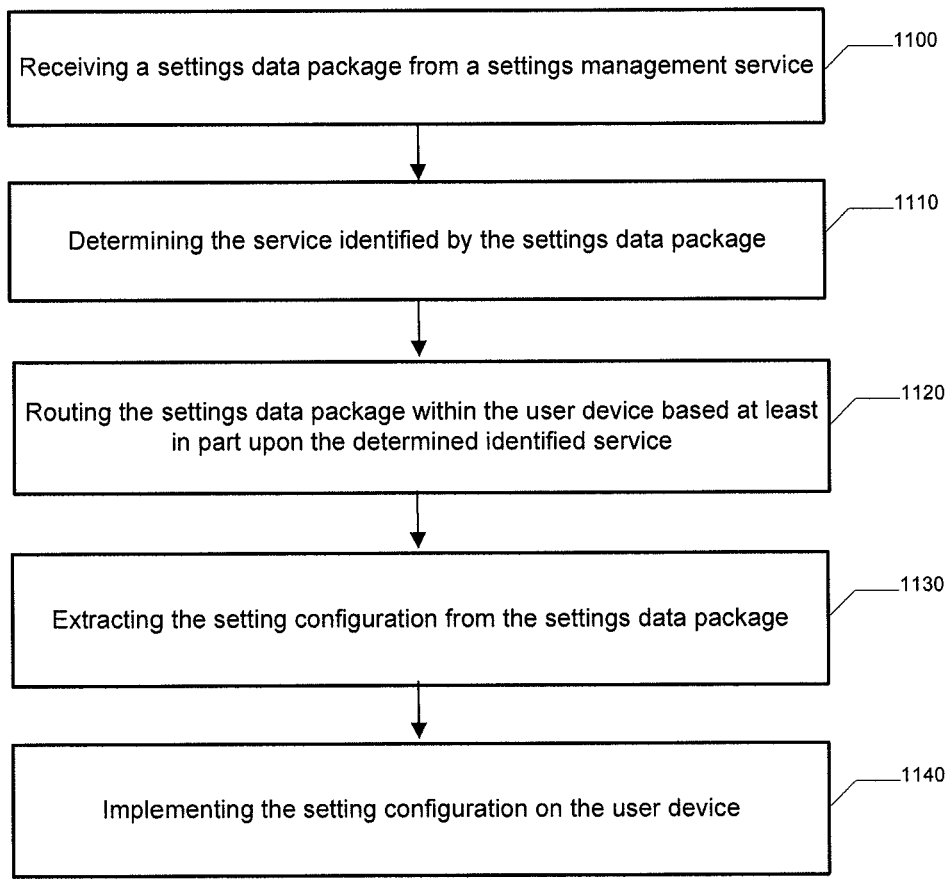
FIG. 11 illustrates an exemplary method for receiving and implementing a synchronized setting configuration according to an exemplary embodiment of the present invention.

FIG. 11 illustrates an exemplary method for receiving and implementing a synchronized setting configuration according to an exemplary embodiment of the present invention. In this regard, FIG. 11 illustrates operations that may occur at a user device 104. The method may include the settings management unit 130 receiving a settings data package from the settings management service 102, at operation 1100. Operation 1110 may comprise the settings management unit 130 determining from information contained in the settings data package, an identity of a service with which the setting configuration included in the settings data package is associated. The settings management unit 130 may, in some embodiments, route the settings data package or the setting configuration contained therein to a service handler entity for the service identified by the settings data package, at operation 1120. Operation 1130 may comprise the settings management unit 130 and/or the service handler entity extracting the setting configuration from the settings data package. It will be appreciated, however, that the ordering of operations 1120 and 1130 may be reversed from the order illustrated in FIG. 11. Operation 1140 may then comprise the settings management unit 130 and/or the service handler entity for the service identified by the settings data package implementing the setting configuration on the user device 104.

Figure 12:
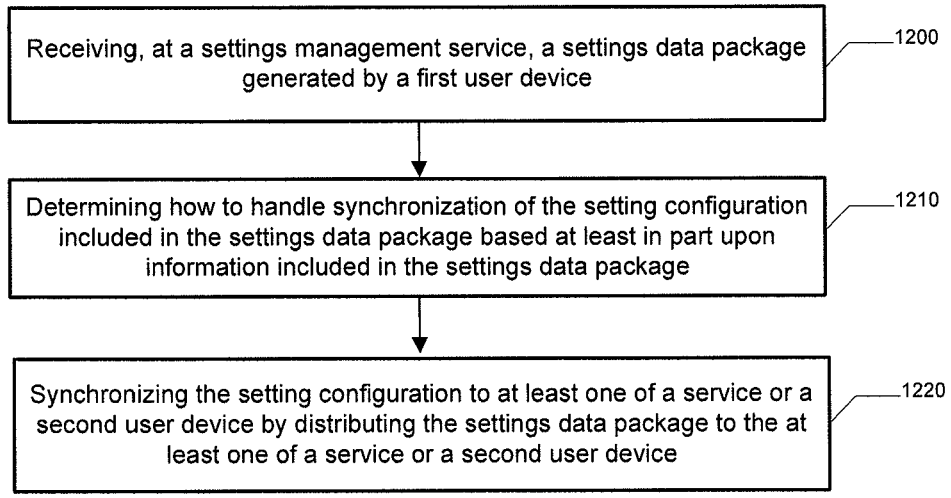
FIG. 12 illustrates an exemplary method for synchronizing a setting configuration according to an exemplary embodiment of the present invention.

FIG. 12 illustrates an exemplary method for synchronizing a setting configuration according to an exemplary embodiment of the present invention. In this regard, FIG. 12 illustrates operations that may occur at a settings management service 102. The method may include the settings control panel unit 118 and/or synchronization server 120 receiving a settings data package generated by a first user device 104, at operation 1200. In this regard, receiving a settings data package may comprise receiving a settings data package sent by the first user device 104 or retrieving a settings data package from the first user device 104. Operation 1210 may comprise the settings control panel unit 118 determining how to handle synchronization of the setting configuration included in the settings data package based at least in part upon information included in the settings data package. In this regard, the settings control panel unit 118 may determine a GUID for the setting configured with the setting configuration included in the settings data package, a user device 104 to which the setting configuration is to be synchronized, a service address indicating a service to which the setting configuration is to be synchronized, a last modified timestamp, and/or other information that may be used in determining how to handle synchronization of the setting configuration included in the settings data package. The settings control panel unit 118 may additionally or alternatively determine how to handle synchronization based at least in part upon user setting configurations defining how the settings management service 102 is to synchronize setting configurations for the user, such as shown in FIG. 9. Operation 1220 may then comprise the settings control panel unit 118 and/or synchronization server 120 synchronizing the setting configuration included in the settings data package to at least one of a service (e.g., a service provider and/or server computing device providing the service) or a second user device 104 by distributing the settings data package to the at least one of a service or second user device 104.

Figure 13:
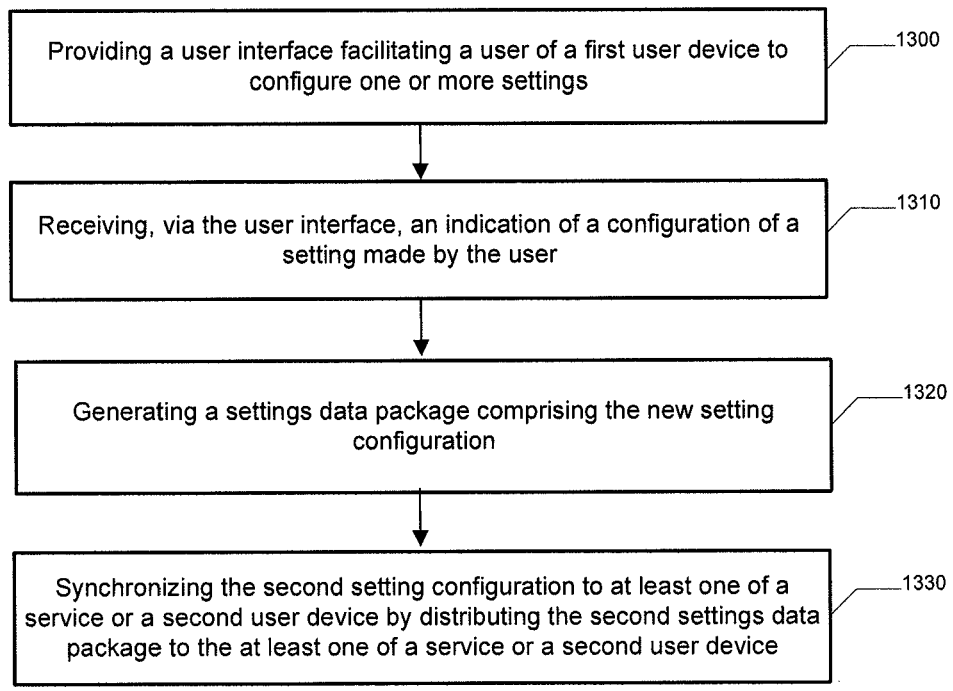
FIG. 13 illustrates an exemplary method for synchronizing a setting configuration according to an exemplary embodiment of the present invention.

FIG. 13 illustrates an exemplary method for synchronizing a setting configuration according to an exemplary embodiment of the present invention. In this regard, FIG. 13 illustrates operations that may occur at a settings management service 102. The method may include the settings control panel unit 118 providing a user interface (e.g., a central UI and/or service UI widget) facilitating a user of a first user device 104 to configure one or more settings, at operation 1300. Operation 1310 may comprise the settings control panel unit 118 receiving, via the user interface, an indication of a configuration of a setting made by the user. The configuration of the setting comprises a setting configuration. Operation 1320 may comprise the settings control panel unit 118 generating a settings data package comprising the setting configuration. Operation 1330 may then comprise the settings control panel unit 118 and/or synchronization server 120 synchronizing the setting configuration to at least one of a second user device 104 (e.g., another user device 104 associated with the user) or a service by distributing the settings data package to the at least one of a second user device 104 or a service.

Figure 14:
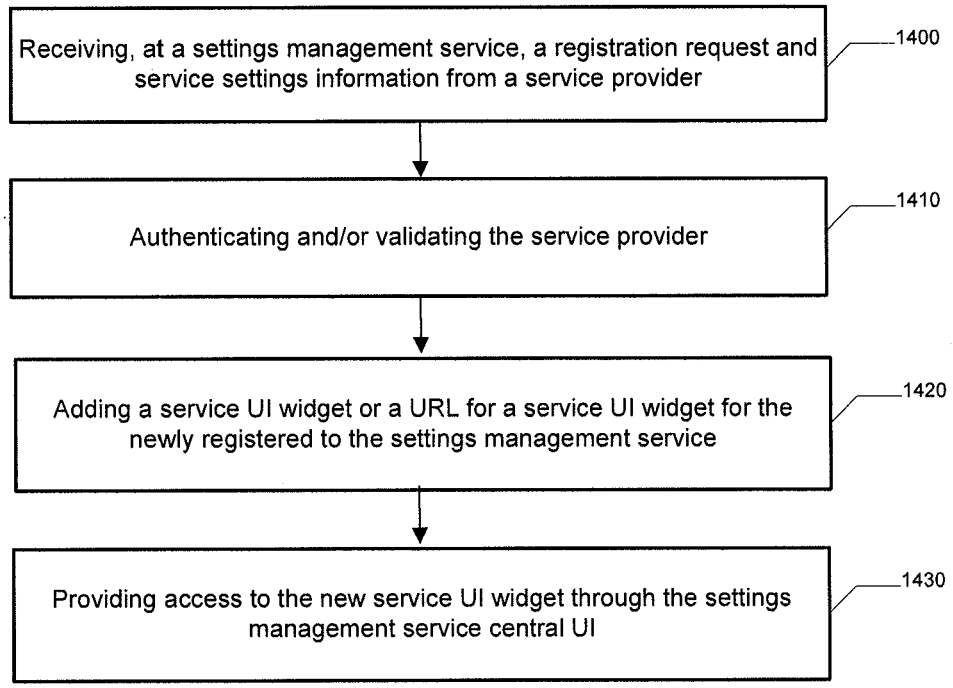
FIG. 14 illustrates an exemplary method for registering a service to the settings management service according to an exemplary embodiment of the present invention.

FIG. 14 illustrates an exemplary method for registering a service to the settings management service 102 according to an exemplary embodiment of the present invention. The method may include the settings control panel unit 118 (e.g., a service registration client 404 implemented and/or controlled by the settings control panel unit 118) receiving a registration request and service settings information from a service provider, at operation 1400. The service registration client 404 may additionally receive service authentication information, such as an access token, token secret, and/or consumer secret, such as in embodiments wherein the settings management service 102 and/or an account management provider enforce a security policy. In such embodiments wherein a security policy is enforced, operation 1410 may comprise the service registration client 404 verifying and/or authenticating the service provider, such as by comparing the received authentication information to verified authentication information provided by the account management provider 302. Operation 1420 may comprise the service registration client 404 adding a new service UI widget and/or a URL for a service UI widget for the newly registered service to the settings management service, such as by storing the service UI widget and/or URL in a memory, such as the memory 114. If the service provider does not directly provide the service UI widget or a URL directed thereto, operation 1420 may further comprise the service registration client 404 generating the service UI widget based at least in part upon service setting information provided by the service provider with the registration request. Operation 1430 may then comprise the settings control panel unit 118 providing access to the service UI widget through the central UI of the settings management service 102.

Figure 15:
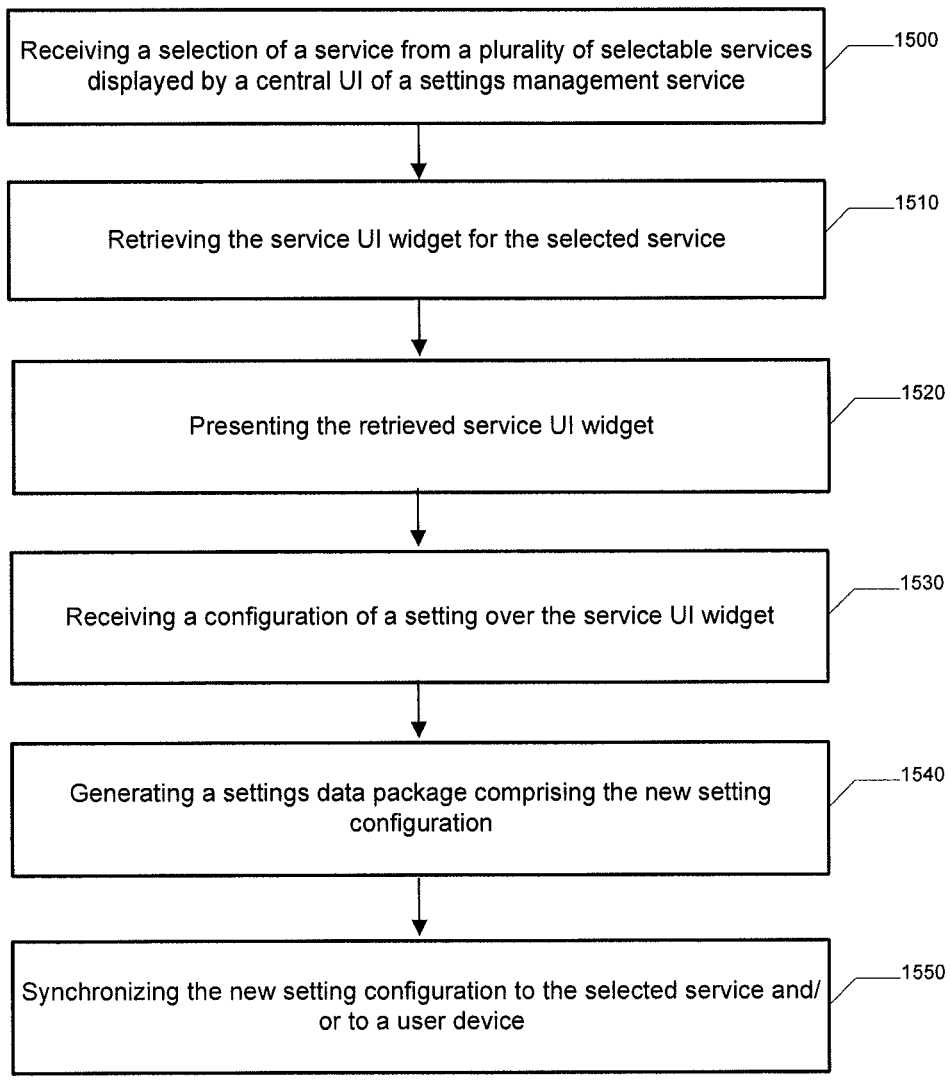
FIG. 15 illustrates an exemplary method for synchronizing a configuration setting for a service according to an exemplary embodiment of the invention.

FIG. 15 illustrates an exemplary method for synchronizing a configuration setting for a service according to an exemplary embodiment of the invention. The method may include the settings control panel unit 118 receiving a selection of a service from a plurality of selectable services displayed by a central UI, at operation 1500. The selection may be made by a user of a user device 104 and may be received from the user device 104. Operation 1510 may comprise the settings control panel unit 118 retrieving the service UI widget for the selected service from a memory, such as the memory 114. The method may further comprise the settings control panel unit 118 presenting the retrieved service UI widget to the user of the user device 104, at operation 1520. Operation 1530 may comprise the settings control panel unit 118 receiving configuration of a setting by the user over the service UI widget. Operation 1540 may comprise the settings control panel unit 118 generating a settings data package comprising the new setting configuration. The method may then comprise the settings control panel unit 118 and/or synchronization server 120 synchronizing the setting configuration to at least one of a service (e.g., the selected service) or a second user device 104 (e.g., another user device 104 associated with the user) by distributing the settings data package to the at least one of a service or a second user device 104.

CONCLUSION

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices, computing device users, and service providers. Embodiments of the invention facilitate synchronization of setting configurations between services and/or user devices. The synchronization performed by embodiments of the invention streamlines usage of services and/or access to data by users having multiple user devices used to access services and/or data. Further, embodiments of the invention enable synchronization of setting configurations between multiple services so that a user only has to configure a setting for one service and the setting is then synchronized to other services. Embodiments of the invention further provide for backup of setting configurations, as setting configurations for a first user device can be synchronized to another user device of the user or back to the first user device, such as if the memory of the first user device is corrupted.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A method comprising:
   providing, by a settings management service via a service-specific application, a user interface to a first user device;
   receiving and storing at the settings management service a new setting configuration of a first service made by a user of the first user device via the user interface; and
   facilitating, by the settings management service, a distribution of the new setting configuration to a second service, a second user device, or a combination thereof.

2. The method of claim 1, wherein the user interface is associated with the first service and is for configuring a setting configuration of the first service.

3. The method of claim 2, further comprising:
   generating a settings data package based, at least in part, on a request by the first user device, the settings management service, a scheduled synchronization time, or a combination thereof; and
   transmitting the settings data package to the settings management service,
   wherein the settings data package comprises the setting configuration.

4. The method of claim 3, further comprising:
   distributing, by the settings management service, the settings data package to the second service, the second user device, or a combination thereof to synchronize the new setting configuration to the second service, the second user device, or a combination thereof when the user uses the second user device to access the second service.

5. The method of claim 3, wherein the settings data package comprises a service identifier uniquely identifying a service, and wherein the settings management service is configured to distribute the settings data package to a server providing the identified service.

6. The method of claim 3, further comprising:
   receiving a second settings data package from the settings management service;
   determining the setting configuration and identified service of the second settings data package;
   routing the second settings data package within the first user device based, at least in part, on the identified service; and
   implementing the second setting configuration on the first user device.

7. The method of claim 1, wherein the new setting configuration comprises privacy setting, and wherein the first service and the second service provide two different services that include multimedia streaming, an online financial service, online gaming, social networking, photograph hosting, video hosting, and music hosting.

8. The method of claim 1, wherein the first user device and the second user device are active at the same time, and the distribution of the new setting configuration goes via the service-specific application.

9. The method of claim 1, wherein the first user device and the second user device are associated with a common user, and wherein the new setting configuration includes one or more marketing settings, one or more advertisement preferences, or a combination thereof.

10. A method comprising:
    providing, by a settings management service via a web browser, a user interface to a first user device;
    receiving and storing at the settings management service a new setting configuration of a first service made by a user of the first user device via the user interface; and
    facilitating, by the settings management service, a distribution of the new setting configuration to a second service, a second user device, or a combination thereof, wherein the new setting configuration is in format of an extensible markup language, and wherein the web browser supports a platform-independent synchronization of the new setting configuration to the second service, the second user device, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
    provide, by a settings management service via a service-specific application, a user interface to a first user device;
    receive and store at the settings management service a new setting configuration of a first service made by a user of the first user device via the user interface; and
    facilitate, by the settings management service, a distribution of the new setting configuration to a second service, a second user device, or a combination thereof.

12. The apparatus of claim 11, wherein the user interface is associated with the first service and is for configuring a setting configuration of the first service.

13. The apparatus of claim 12, wherein the apparatus is further caused to:
    generate a settings data package based, at least in part, on a request by the first user device, the settings management service, a scheduled synchronization time, or a combination thereof; and
    transmit the settings data package to the settings management service,
    wherein the settings data package comprises the setting configuration.

14. The apparatus of claim 13, wherein the apparatus is further caused to:
    distribute, by the settings management service, the settings data package to the second service, the second user device, or a combination thereof to synchronize the new setting configuration to the second service, the second user device, or a combination thereof.

15. The apparatus of claim 11, wherein the new setting configuration comprises privacy setting.

16. The apparatus of claim 11, wherein the first user device and the second user device are active at the same time.

17. The apparatus of claim 11, wherein the new setting configuration is in format of an extensible markup language.

18. A non-transitory computer-readable storage medium carrying one or more sequences of one or more instructions which, when executed by one or more processors, cause an apparatus to perform:
    providing, by a settings management service via a service-specific application, a user interface to a first user device;
    receiving and storing at the settings management service a new setting configuration of a first service made by a user of the first user device via the user interface; and
    facilitating, by the settings management service, a distribution of the new setting configuration to a second service, a second user device, or a combination thereof.

19. The non-transitory computer-readable storage medium of claim 18, wherein the user interface is associated with the first service and is for configuring a setting configuration of the first service.

20. The non-transitory computer-readable storage medium of claim 19, wherein the apparatus is further caused to perform:
    generating a settings data package based, at least in part, on a request by the first user device, the settings management service, a scheduled synchronization time, or a combination thereof; and
    transmitting the settings data package to the settings management service,
    wherein the settings data package comprises the setting configuration.

* * * * *